US011985208B2

(12) United States Patent
Ionescu et al.

(10) Patent No.: US 11,985,208 B2
(45) Date of Patent: *May 14, 2024

(54) SYSTEMS AND METHODS FOR CACHING OF MANAGED CONTENT IN A DISTRIBUTED ENVIRONMENT USING A MULTI-TIERED ARCHITECTURE INCLUDING OFF-LINE ACCESS TO CACHED CONTENT

(71) Applicant: Open Text SA ULC, Halifax (CA)

(72) Inventors: Nicolae Ionescu, Toronto (CA); Dan-Horia Trufasiu, Newmarket (CA); Peter Varga, Markham (CA); Tao Zhou, Richmond Hill (CA); Franz Pauthner, Zorneding (DE); Yue Kuk Wong, Toronto (CA)

(73) Assignee: Open Text SA ULC, Halifax (CA)

( * ) Notice: Subject to any disclaimer, the term of this patent is extended or adjusted under 35 U.S.C. 154(b) by 0 days.

This patent is subject to a terminal disclaimer.

(21) Appl. No.: 18/073,401

(22) Filed: Dec. 1, 2022

(65) Prior Publication Data

US 2023/0103157 A1 Mar. 30, 2023

Related U.S. Application Data

(63) Continuation of application No. 17/204,589, filed on Mar. 17, 2021, now Pat. No. 11,558,485, which is a (Continued)

(51) Int. Cl.
*H04L 67/568* (2022.01)
*G06F 16/17* (2019.01)
(Continued)

(52) U.S. Cl.
CPC .......... *H04L 67/568* (2022.05); *G06F 16/172* (2019.01); *G06F 16/173* (2019.01);
(Continued)

(58) Field of Classification Search
CPC . H04L 67/10–67/1097; G06F 16/172–16/173; G06F 16/23–16/2329; G06F 16/24–16/2474
See application file for complete search history.

(56) References Cited

U.S. PATENT DOCUMENTS 7,437,364 B1 * 10/2008 Fredricksen ............ G06F 16/93
11,375,037 B2 6/2022 Ionescu
(Continued)

OTHER PUBLICATIONS

Office Action issued for U.S. Appl. No. 17/471,694, dated Aug. 3, 2023, 31 pages.
(Continued)

*Primary Examiner* — Clayton R Williams
(74) *Attorney, Agent, or Firm* — Sprinkle IP Law Group

(57) ABSTRACT

Embodiments as disclosed provide a distributed caching solution that improve the performance and functionality of a content management platform for sites that are physically or logically remote from the primary site of the content management platform. In particular, according to embodiments, a remote cache server may be associated with a remote site to store local copies of documents that are managed by the primary content management platform. Periodically, a portion of the remote site's cache may be synchronized with the content management platform's primary site using an extensible architecture to ensure that content at the remote cache server is current.

21 Claims, 7 Drawing Sheets

Related U.S. Application Data continuation of application No. 16/752,357, filed on Jan. 24, 2020, now Pat. No. 10,992,767, which is a continuation of application No. 16/276,687, filed on Feb. 15, 2019, now Pat. No. 10,581,999, which is a continuation of application No. 15/434,235, filed on Feb. 16, 2017, now Pat. No. 10,250,710, which is a continuation of application No. 15/094,524, filed on Apr. 8, 2016, now Pat. No. 10,021,209.

(60) Provisional application No. 62/296,329, filed on Feb. 17, 2016, provisional application No. 62/146,030, filed on Apr. 10, 2015.

(51) Int. Cl.
| | |
|---|---|
| *G06F 16/172* | (2019.01) |
| *G06F 16/23* | (2019.01) |
| *G06F 16/2458* | (2019.01) |
| *H04L 67/1097* | (2022.01) |

(52) U.S. Cl.
CPC ...... *G06F 16/2329* (2019.01); *G06F 16/2474* (2019.01); *H04L 67/1097* (2013.01)

(56) References Cited

U.S. PATENT DOCUMENTS

| | | | | |
|---|---|---|---|---|
| 2004/0249965 | A1* | 12/2004 | Huggins | H04L 69/329 709/231 |
| 2008/0320225 | A1* | 12/2008 | Panzer | H04L 67/02 711/E12.017 |
| 2010/0325363 | A1* | 12/2010 | Olesen | G06F 12/0815 711/135 |
| 2013/0198313 | A1* | 8/2013 | Hayton | H04L 67/5682 709/213 |

OTHER PUBLICATIONS

Notice of Allowance issued for U.S. Appl. No. 17/471,694, mailed Mar. 8, 2024, 9 pages.

* cited by examiner

SYSTEMS AND METHODS FOR CACHING OF MANAGED CONTENT IN A DISTRIBUTED ENVIRONMENT USING A MULTI-TIERED ARCHITECTURE INCLUDING OFF-LINE ACCESS TO CACHED CONTENT

RELATED APPLICATIONS

This application is a continuation of, and claims a benefit of priority to, U.S. patent application Ser. No. 17/204,589 filed Mar. 17, 2021, entitled "SYSTEMS AND METHODS FOR CACHING OF MANAGED CONTENT IN A DISTRIBUTED ENVIRONMENT USING A MULTI-TIERED ARCHITECTURE INCLUDING OFF-LINE ACCESS TO CACHED CONTENT," issued as U.S. Pat. No. 11,558,485, which is a continuation of, and claims a benefit of priority to, U.S. patent application Ser. No. 16/752,357 filed Jan. 24, 2020, entitled "SYSTEMS AND METHODS FOR CACHING OF MANAGED CONTENT IN A DISTRIBUTED ENVIRONMENT USING A MULTI-TIERED ARCHITECTURE INCLUDING OFF-LINE ACCESS TO CACHED CONTENT," issued as U.S. Pat. No. 10,992,767, which is a continuation of, and claims a benefit of priority to, U.S. patent application Ser. No. 16/276,687 filed Feb. 15, 2019, entitled "SYSTEMS AND METHODS FOR CACHING OF MANAGED CONTENT IN A DISTRIBUTED ENVIRONMENT USING A MULTI-TIERED ARCHITECTURE INCLUDING OFF-LINE ACCESS TO CACHED CONTENT," issued as U.S. Pat. No. 10,581,999, which is a continuation of and claims a benefit of priority to U.S. patent application Ser. No. 15/434,235 filed Feb. 16, 2017, entitled "SYSTEMS AND METHODS FOR CACHING OF MANAGED CONTENT IN A DISTRIBUTED ENVIRONMENT USING A MULTI-TIERED ARCHITECTURE INCLUDING OFF-LINE ACCESS TO CACHED CONTENT," issued as U.S. Pat. No. 10,250,710, which is a continuation of and claims a benefit of priority to U.S. patent application Ser. No. 15/094,524 filed Apr. 8, 2016, entitled "SYSTEMS AND METHODS FOR CACHING OF MANAGED CONTENT IN A DISTRIBUTED ENVIRONMENT USING A MULTI-TIERED ARCHITECTURE," issued as U.S. Pat. No. 10,021,209, which claims the benefit of priority under 35 U.S.C. § 119 to U.S. Provisional Patent Application No. 62/146,030, filed Apr. 10, 2015, entitled "SYSTEMS AND METHODS FOR CACHING OF MANAGED CONTENT IN A DISTRIBUTED ENVIRONMENT USING A MULTI-TIERED ARCHITECTURE," and U.S. Provisional Patent Application No. 62/296,329 filed Feb. 17, 2016, entitled "SYSTEMS AND METHODS FOR CACHING OF MANAGED CONTENT IN A DISTRIBUTED ENVIRONMENT USING A MULTI-TIERED ARCHITECTURE INCLUDING OFF-LINE ACCESS TO CACHED CONTENT". This application is a continuation of, and claims a benefit of priority to, U.S. patent application Ser. No. 17/204,589 filed Mar. 17, 2021, entitled "SYSTEMS AND METHODS FOR CACHING OF MANAGED CONTENT IN A DISTRIBUTED ENVIRONMENT USING A MULTI-TIERED ARCHITECTURE INCLUDING OFF-LINE ACCESS TO CACHED CONTENT," which is a continuation of, and claims a benefit of priority to, U.S. patent application Ser. No. 16/752,357, filed Jan. 24, 2020, entitled "SYSTEMS AND METHODS FOR CACHING OF MANAGED CONTENT IN A DISTRIBUTED ENVIRONMENT USING A MULTI-TIERED ARCHITECTURE INCLUDING OFF-LINE ACCESS TO CACHED CONTENT", issued as U.S. Pat. No. 10,992,767, which is a continuation of, and claims a benefit of priority to, U.S. patent application Ser. No. 16/276,687, filed Feb. 15, 2019, entitled "SYSTEMS AND METHODS FOR CACHING OF MANAGED CONTENT IN A DISTRIBUTED ENVIRONMENT USING A MULTI-TIERED ARCHITECTURE INCLUDING OFF-LINE ACCESS TO CACHED CONTENT", issued as U.S. Pat. No. 10,581,999, which is a continuation of, and claims a benefit of priority to, U.S. patent application Ser. No. 15/434,235, filed Feb. 16, 2017, entitled "SYSTEMS AND METHODS FOR CACHING OF MANAGED CONTENT IN A DISTRIBUTED ENVIRONMENT USING A MULTI-TIERED ARCHITECTURE INCLUDING OFF-LINE ACCESS TO CACHED CONTENT", issued as U.S. Pat. No. 10,250,710, which claims the benefit of priority under 35 U.S.C. § 119 to U.S. Provisional Patent Application No. 62/296,329, filed Feb. 17, 2016, entitled "SYSTEMS AND METHODS FOR CACHING OF MANAGED CONTENT IN A DISTRIBUTED ENVIRONMENT USING A MULTI-TIERED ARCHITECTURE INCLUDING OFF-LINE ACCESS TO CACHED CONTENT" by Pauthner et al. All referenced applications are hereby fully incorporated by reference herein for all purposes.

TECHNICAL FIELD

This disclosure relates generally to the caching of content in a distributed network environment. More particularly, this disclosure relates to embodiments of systems and methods for caching managed content in a distributed network environment utilizing a multi-tiered architecture, and the optimization of such systems and methods. Even more specifically, this disclosure relates to embodiments of systems and methods for allowing access to cached managed content in a distributed network environment utilizing a multi-tiered architecture, including access to such cached managed content in both on-line and off-line settings.

BACKGROUND

Increasingly, in the computing world, functionality is distributed. Such distribution is achieved through the separation of the functionality or data (collectively resources), and the physical or logical decoupling of such resources. In order to accomplish certain tasks or applications multiple resources may be needed. Thus, communications between various components may be required when implementing that functionality.

To illustrate in more detail, in many cases content (which may also be referred to herein as documents or files) may be accessed from a number of users spread across many different sites or networks using a number of different applications. This situation presents a special set of challenges, as many of these users may need to work collaboratively on a document, or the content may be part of enterprise which wishes to manage the content (e.g., version such content, maintain a historical archive of such content, reconcile changes, apply permissions to such content, etc.).

In order to manage the content, however, an at least somewhat centralized management environment may need to be applied to the content. Specifically, in certain content management environments a primary content management platform may serve as a centralized access point for the content, applying permissions, versioning, etc. to the content. As may be seen, however, the use of such a centralized management platform may be antithetical to the highly distributed environment in which the content is accessed and utilized.

In particular, use of these types of centralized management architectures in a distributed network environment may present certain problems, some of the most concerning of which have to do with speed of access. As detailed above, in many cases the users who access content may be distributed, and remote from, a centralized content management platform, with varying speed, bandwidth and reliability of network connections to such a content management platform. Despite these types of variations, all accesses by all users to the managed content must go through the primary content management server in order that the content being accessed may be managed in conjunction with the access. Such accesses may therefore require a number of communications between whatever application is being utilized to access the content and the primary content management server in order to, for example, reconcile permissions, version the content, download the content from the management server to the user's local device, upload changes from the user's application to the central management server, or perform other functionality involve with managing the content.

For at least these reasons then, because access to content may be distributed, and remote from, a centralized content management platform, with varying speed, bandwidth and reliability of network connections, both the availability of content and the speed of access to such content when it is available may be inconsistent. If the network connection is slow or unavailable, a user's access to desired content may be impeded.

Accordingly, what is needed are systems and methods which speed or otherwise serve to optimize access to managed content in a distributed network environment.

SUMMARY

To address those desires, among other ends, embodiments as disclosed herein may provide a distributed caching solution that improve the performance and functionality of a content management platform for sites that are physically or logically remote from the primary site of the content management platform (e.g., the physical or logical site of a main installation of the content management platform).

In particular, according to certain embodiments, a remote cache server may be associated with a remote site to store local copies of documents that are managed by the primary content management platform. Periodically, a portion (which may be a single document) of remote site's cache may be synchronized with the content management platform's primary site using an extensible architecture to ensure that content at the remote cache server is current. This synchronization may provide users at the remote site dramatically faster access to current content while still adhering to the management model (e.g., permissions or access controls, versioning, etc.) of the primary content management platform.

Generally, to accomplish such synchronization a remote cache module at the remote cache server may monitor requests associated with users at the remote site. If a user at a particular remote site requests a document that is already cached at the remote cache server, that remote cache server satisfies the request locally (e.g., from the cache at the remote cache server). If the document is not available, the remote cache server obtains it from the primary content management platform, and then caches it on the remote cache server so that it can satisfy any subsequent requests locally.

Embodiments of such a remote cache server may work for document uploads as well as downloads. Whenever a user at a remote site adds a document or a document version, the remote cache server first caches the document or version locally. The remote cache server can then forward the document or version to the primary content management platform, so that the change is synchronized with the content management platform at the primary site.

According to certain embodiments, the content in the cache at the remote cache server may be accessed by a user within the remote site even in instances where the primary content management server is unavailable. In particular, in the event of loss of connectivity (e.g., due to network problems or issues with the primary content management server) the content resident in the remote cache may be made available for access to the users at the remote site.

Additionally, to aid in maintaining availability of particular content an administrator associated with a user site may designate a file, a folder or other content for storage in the remote cache server. As such the designated content may remain at the remote cache server and is available (along with the other content in at the remote cache server) even when the primary content management server is unavailable due to, for example, network problems or problems with the primary content management server itself.

In particular, in certain embodiments a multi-tiered architecture may be implemented in conjunction with remote cache servers deployed at remote sites to allow embodiments of the distributed caching system as disclosed to be utilized with a wide variety of content management platforms. Each tier of the architecture may be configured to minimize communications between other tiers of the caching system (and between tiers of the caching system and management platforms) and to optimize those communications that do occur. Moreover, an extensible architecture may be employed in certain tiers such that the same caching system may be utilized in conjunction with a number of different repository platforms serving as primary content management servers and new repository platforms may be easily added.

In some embodiments, a system for remote caching includes a primary content management server for managing content, a remote cache system including a cache and a data store for storing metadata corresponding to content stored in the cache, where the content in cache is managed by the primary content management server. A remote client transfer module is associated with the remote cache system and can receive a first request to access content. This first request may be associated with a particular user. The remote client transfer module can access the data store to determine if first metadata associated with the requested content is stored in the data store. Based on the presence of the metadata, the remote client transfer module may send a first request to a primary content transfer module associated with the primary content management server and receive a first response from the primary content transfer module including second metadata.

The remote client transfer module can compare the first metadata to the second metadata to determine if a version of the content stored in the cache is a current version of the content. If the version of the content stored in the cache is a current version the content in the cache can be provided in response to the first request while if the version of the content stored in the cache is not the current version a second request for the current version of the content may be sent to the primary content transfer module. The current version of the content may be received, stored in the cache and provided in response to the first request.

In a similar embodiment, the primary content transfer module may be associated with the primary content management platform and can receive the first request associated with the content from the remote client transfer module and send a third request to the primary content management server for the second metadata associated with the content. The primary content transfer module can also determine if the user has permission to access the content based on the second metadata and the first request and if the user does not have permission return a response indicating this to the remote client transfer module.

The primary content transfer module can also return the first response, including the second metadata, to the remote client transfer module and receive the second request for the current version of the content. The current version of the content can be obtained from the content management platform and returned to the remote client transfer module.

Accordingly, embodiments as disclosed herein may provide a number of advantages, and in particular a number of advantages that serve to address or remedy problems that arise through the implementation and use of content management platforms and managed content in a distributed computer network environment. For example, a remote site may have a low-bandwidth connection to the primary site resulting in slow access to content, dropped connections, denied or delay access or other problems.

Embodiments as disclosed may provide the technical advantage of allowing highly efficient caching to be implemented in conjunction with managed content even in such distributed computer environment. More specifically, embodiments may allow this caching to be implemented in conjunction with a wide variety of content management platforms and provide the extensibility to allow other content management platforms to be added to the distributed caching system with minimal effort. Moreover, by minimizing the number of communications that occur with respect to such a caching architecture the speed and efficiency of the caching of the management content may be substantially increased.

Additionally, embodiments as depicted herein may minimize the communications between remote cache servers and primary content management servers, in some cases allowing the caching of content resulting from content access requests from users to be resolved in single communication between a remote cache server and a primary content management server.

Furthermore, embodiments as disclosed herein may ensure the high availability of frequently accessed or other content by users at a site, even in the event of interruptions in connectivity or problems with the primary content server.

Embodiments as disclosed may thus provide the technical advantage of allowing highly efficient caching to be implemented in conjunction with managed content in a distributed computer environment.

These and other aspects of the invention will be better appreciated and understood when considered in conjunction with the following description and the accompanying drawings. The following description, while indicating various embodiments of the invention and numerous specific details thereof, is given by way of illustration and not of limitation. Many substitutions, modifications, additions or rearrangements may be made within the scope of the invention, and the invention includes all such substitutions, modifications, additions or rearrangements.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore non-limiting, embodiments illustrated in the drawings, wherein identical reference numerals designate the same components. Note that the features illustrated in the drawings are not necessarily drawn to scale.

DETAILED DESCRIPTION

Figure 1:
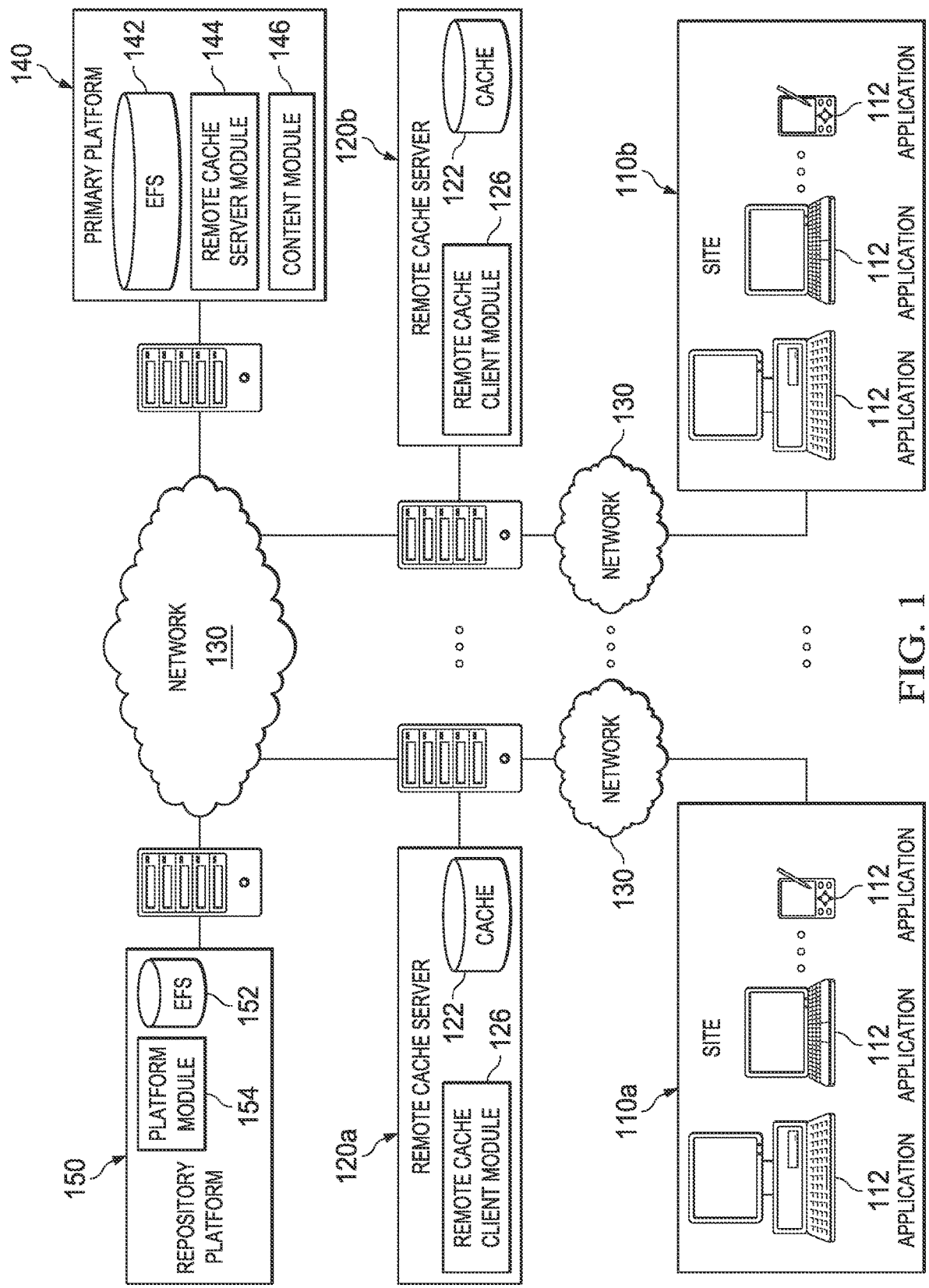
FIG. 1 depicts a diagrammatic representation of an example of a system and architecture for caching.

The invention and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure the invention in detail. It should be understood, however, that the detailed description and the specific examples, while indicating some embodiments of the invention, are given by way of illustration only and not by way of limitation. Various substitutions, modifications, additions and/or rearrangements within the spirit and/or scope of the underlying inventive concept will become apparent to those skilled in the art from this disclosure.

Before delving into more detail regarding the specific embodiments disclosed herein, some brief context may be helpful. As discussed, in the computing world functionality is often distributed. Additionally, it is often the case that content is often subject to management through the use of content management platforms. It should be noted here that the description herein regularly refers to content, documents and document versions. In practice, embodiments apply to any type of digital information that may be stored, and the term "document" or "content" is used as a convenience. Where "documents", "content" or "files" are referenced, it should be understood that any type of stored and managed information may utilized with embodiments, including but not limited to: that produced by office productivity software such as text editors, spreadsheets and slide presentations; publishing formats such as Adobe PDF; computer aided design and drafting files; scanned images; photographs; digital audio information; digital video information; computer output report, log files or print files; web pages; computer software source code; or other data that may be stored on digital media.

Such content may be accessed from a number of users spread across many different sites or networks using a number of different applications. This situation presents a special set of challenges, as many of these users may need to work collaboratively on a document, or the content may be part of enterprise which wishes to manage the content (e.g., version such content, maintain a historical archive of such content, reconcile changes, apply permissions or access controls to such content, etc.).

A primary content management platform may, however, serve as a centralized access point for the content, applying permissions, versioning, etc. to the content. The use of these types of centralized management architectures may present certain problems having to do with availability of, or speed of access to, content. Because access to content may be distributed, and remote from, a centralized content management platform, with varying speed, bandwidth and reliability of network connections, the availability of content may be inconsistent. Specifically, if the network connection is slow or unavailable, a user's access to desired content may be impeded. What is desired are systems and methods which speed or otherwise serve to optimize access to this manage content in a distributed environment.

To that end, attention is now directed to the systems and methods for the caching of managed content in a distributed network environment. Specifically, in certain embodiments a caching architecture may be utilized in which a remote cache server associated with a primary content management server is deployed at each of one or more remote sites (also referred to as user sites) such that content managed by the primary content management platform (also referred to as the primary server) is cached on these remote cache servers. Content may then be accessed by users at the remote site utilizing this remote cache.

In particular, in certain embodiments a multi-tiered architecture may be implemented in conjunction with remote cache servers deployed at remote sites to allow embodiments of the distributed caching system as disclosed to be utilized with a wide variety of content management platforms. Each tier of the architecture may be configured to be minimize communications between other tiers of the caching system (and between tiers of the caching system and content management platforms) and to optimize those communications that do occur, as will be explained in more detail at a later point herein. Moreover, an extensible architecture may be employed in certain tiers such that the same caching system may be utilized in conjunction with a number of different repository platforms serving as primary content management servers and new repository platforms may be easily added.

The use of such an architecture may allow content in the cache of the remote server to be accessed by a user within the remote site even in instances where the primary server is unavailable (e.g., in an off-line setting). In particular, in the event of loss of connectivity (e.g., due to network problems or issues with the primary server) the content resident in the cache may be made available for access to the users. For example, to aid in maintaining availability of particular content an administrator associated with a remote site may designate a file, a folder or other content for storage in the remote cache server. Thus, when the network is available the remote cache server may obtain the designated content from the primary server and store the designated content in the cache at the remote cache server. This designated content may not be subject to any cache replacement policy or other storage policy utilized with the content at the remote cache server and accesses by users at the site to content. As such the designated content may remain in the cache at the remote cache server and is available (along with the other content in at the remote cache server) even when the primary content server is off-line (e.g., unavailable) due to, for example, network problems or problems with the primary server itself.

Referring first to FIG. 1 then, one example of an architecture for the remote caching of managed content is depicted. Here, the architecture includes primary content management platform 140 which is an instance of a repository server responsible for managing content. Content management platform may include one or more server computers which may be coupled to one or more other repository platforms 150, users at remote sites 110 (e.g., 110a, 110b) and remote cache servers 120 (e.g., 120a, 120b) through network 130. Network 130 may be the Internet, an intranet, a wireless or wired network, a LAN, a WAN, some combination of these types of networks, or another type of computer network.

Primary content management platform 140 may, for example, be one or more computers configured with OpenText's Content Server, OpenText's Archive Server or another type of repository, content management or storage server (collectively referred to as a content management platform or server, a repository platform or server or a primary server). The content managed by primary server 140 may be stored on a data store (electronic file store (EFS)) 142 associated with the primary server 140 itself, or may, in turn, be stored and managed by another repository server 150 which itself has an EFS 152.

In cases where the content is stored or managed by another repository server 150, the primary server 140 may include metadata on the content indicating the repository server 150 on which the content is stored in addition to any other metadata maintained by primary server 140 on the content. Such a repository server 150 may, for example, be an instance of OpenText's Archive Server or Content Server.

Users at remote sites 110 may utilize platform client applications 112 to access content managed by primary server 140. It will be understood that a site 110 is a physical or logical grouping of associated devices or users coupled over a network (which may be separate from, or include, network 130). Such a grouping may be based upon geographic considerations, business or organizational considerations, network considerations (e.g., a site may be a particular IP address range) or other considerations entirely.

Generally, then, application 112 is a proprietary application, a plug-in or extension of an existing application (such as those existing applications forming a part of the Microsoft Office Suite) or a web based application for use on a browser such as those known in the art, including, for example, Internet Explorer, Firefox, Chrome, etc., that are provided through an accessed web page or the like. No matter the particular implementation, however, application 112 may be configured to access (e.g., open, download, view, edit, save, upload or otherwise access) content managed by primary server 140.

In the embodiment of the architecture depicted, remote cache server 120 is deployed in conjunction with a particular site 110. It will be noted however, that remote cache server 120 may be deployed for a portion of a remote site 110 or for multiple remote sites 110. When a user using an application 112 at that site 110 desires to access content managed by primary server 140 then, the access request from the application 112 is directed to remote cache server 120 deployed at the site 110.

Remote cache client module 126 on the remote cache server 120 receives this request and makes the determination if the request can be satisfied from cache 122 at the remote cache server 120 (e.g., is the requested content 122 in cache 122, is the version of the content in the cache 122 the current version of the content, does the user requesting the access have the proper permissions to access the content, does the content being saved and does it need to be reconciled with content at the primary server 140, etc.). To process such an access request then, the remote cache client module 126 may communicate with, and make a number of requests to, remote cache server module 144. Such a request may include metadata or other identifying information for the content requested or the user. These requests may be independent and can consume both time and resources.

Moreover, in certain cases, primary server 140 may itself have to obtain the content from one or more other repository platforms 150 on which the content is actually stored. These other repository platforms 150 may be of the same or a different type than the primary server 140. Consider the case of an access request by a user for particular content. Initially, the request may be received by the remote cache client module 126 at the remote cache server 120 deployed at the site 110. Remote cache client module 126 may then send a request to the remote cache server module 144 at the primary server 140 to determine if the requesting user has the proper permissions to access the requested content. Remote cache server module 144 receives the request and utilizes the content management module 146 at the primary server 140 to determine if the user has the appropriate permissions for the requested content and returns the response to the remote cache client module 126.

If the user has permissions to access the content, the remote cache client module 126 may then check cache 122 to determine if the content is in the cache 122. If the requested content is not in the cache the remote cache client module 126 may send a request to remote cache server module 144 to obtain the content. Alternatively, if the content is in the cache 122 the remote cache client module 126 may send a request with a version number of the content in cache 122 to check and see if the version is the latest version.

When remote cache server module 144 receives such a request it may access content module 146 to check the version of obtained the requested content. If the requested content is stored in the EFS 152 at another repository platform 150 content module 146 may, in turn, have to obtain the content (or other information) from repository platform 150 (e.g., by sending a request to platform module 154 on the repository server 150). In the case of obtaining the requested content then, the primary server 140 obtains the requested content from repository platform 150 and then returns the content to remote cache client module 126. The requested content can then be stored or updated (collectively stored) in cache 122 for future access.

As can be seen then, there may be certain inefficiencies with particular implementations of remote caching. Including, for example, cache 122 may contain not only content but metadata related to that content. The metadata may in fact, be stored in the same, or a related file, to the content. Thus, searching for metadata for content may be inefficient and time consuming. Moreover, the use of multiple independent requests between the remote cache server 120 and the primary server 140 may result in high latency of access.

Adding to this latency may be the fact that, in cases where the content is stored on another repository platform 150 the primary server 140 may have to obtain this content from the repository platform 150 before it can provide this content to the remote cache server 120, which, in turn, provides it to the requesting user.

Accordingly, in certain embodiments for remote caching as depicted herein a multi-tiered architecture may be implemented in conjunction with the remote cache servers deployed at user's sites to minimize communications between other tiers of the caching system (and between tiers of the caching system and management platforms) and to optimize those communications.

Figure 2:
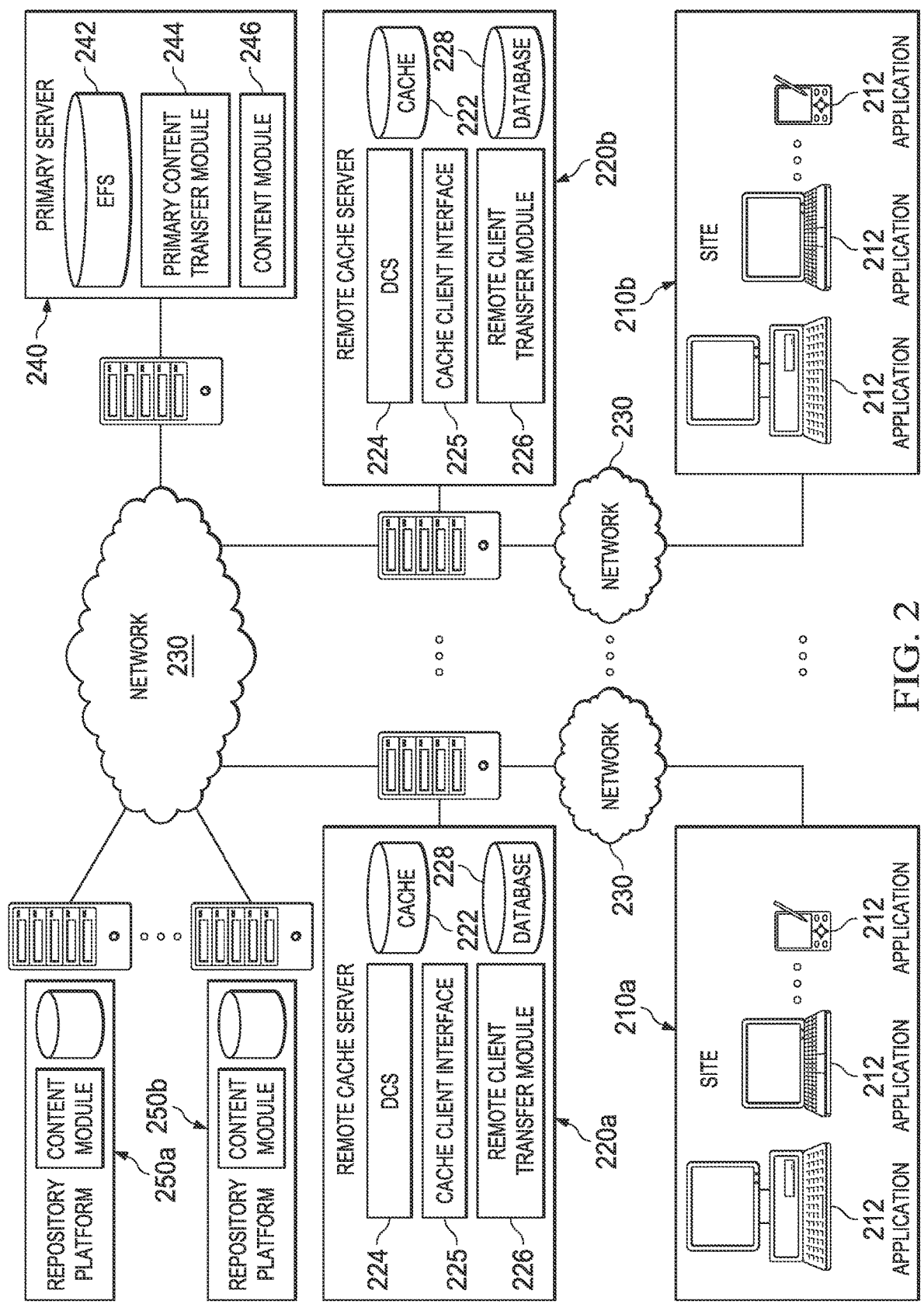
FIG. 2 depicts a diagrammatic representation of an embodiment of a system and architecture for caching in a distributed environment.

FIG. 2 depicts one embodiment of such a multi-tiered architecture for the remote caching of managed content in a distributed network environment. Again, the architecture includes primary content management server 240 which is responsible for managing content coupled to one or more other repository platforms 250, users at remote sites 210 (e.g., 210a, 210b) and remote cache servers 220 (e.g., 220a, 220b) through network 230 (e.g., be the Internet, an intranet, a wireless or wired network, a LAN, a WAN, some combination of these types of networks, etc.).

Here, in order to implement the caching of content managed by the primary server 240, remote cache server 220 includes a database (DB) 228 and cache (e.g., a data store) 222 where cache 222 is used to store cached versions of the content managed by primary content management server 240 and DB 228 is used to store corresponding metadata for the content stored in cache 222. Thus, content in cache 222 may have corresponding metadata in DB 228 and the metadata in DB 228 and the content in cache 222 may be searched, manipulated or otherwise accessed independently from one another. Such metadata may include, for example, the type of content, size, author, location in cache 222, version number, identifier (e.g., identifier of, or used by, primary server 240), etc.

Remote cache server 220 may also include cache client interface 225, which includes one or more interfaces configured to accept requests from an application 212 for use with a particular type of repository platform which may be utilized as primary server 240. For example, one interface may be configured to accept and process requests from application 212 for use with OpenText's Enterprise Connect while another module may be configured to accept and process requests from application 212 for use with OpenText's Archive Server. For example, one of the cache client interfaces 225 may be a common gateway interface (CGI) configured to be accessed from applications 212 that are utilized in a web based environment. Thus, such a CGI interface could, for example, accept requests issued through a hypertext transfer protocol (HTTP) GET or POST with a particular universal resource locator (URL).

There may also be an interface 225 configured to accept and process requests from applications 212 that are sending request to an existing cache service (e.g., an existing remote cache service). The cache client interface 225 may be configured to determine if such requests are not content related and may forward those requests directly to the repository platform 250 or primary server 240 for which the request may be intended.

If the request is content related it may be submitted to remote client transfer module 226. In one embodiment, the cache client interface 225 forwards this request for content access in a format utilized by the remote client transfer module 226 such that no matter the repository platform 250 or type of primary server 240 with which application 212 is designed to be utilized the request is received by remote client transfer module 226 in a standard format. For example, remote client transfer module 226 may provide a web services interface such as a REpresentational State Transfer (REST) interface or a Simple Object Access Protocol (SOAP) based interface. Cache client interface 225 may utilize this web services interface to forward the request for content access to the remote client transfer module 226.

Remote client transfer module 226 can then utilize the metadata in DB 228 to determine if requested content is in cache and, if it is, what the version number, identifier, etc. for that content is, without accessing the content in cache 222 itself. Remote client transfer module 226 can then send an appropriate request to primary content transfer module 244. The request may include an identifier or version (e.g., the version of the content if it exists in cache 222) for the content, an identifier for the user or other information. This request may be formatted according to a format utilized by primary content transfer module 244. Again, primary content transfer module 244 may provide a web services interface such as a REST interface or a SOAP based interface. Remote client transfer module 226 may utilize this web services interface to issue a request to the primary content transfer module 244.

Primary content transfer module 244 may receive the request and process it accordingly. Specifically the primary content transfer module 244 may obtain the metadata for the requested file from the content module 246 of the primary server 240. As discussed, primary server 240 may be a certain type of repository server. Thus, to insure that caching systems as disclosed herein may be utilized with different types of primary servers 240, primary content transfer module 244 may employ one or more repository connectors, where each repository connector is configured to receive requests and issue those requests to the content module of a corresponding type of repository server in a format appropriate for that type of repository server.

For example, one repository connector may be configured for use with OpenText's Content Server while another repository connector may be utilized with OpenText's Archive Server. It will be noted that in certain embodiments, such repository connectors may be instantiated or deployed for each repository platform with which the primary content transfer module 244 is to be utilized such that there may be a one to one correspondence with repository connectors and repository platforms being utilized with the primary content transfer module 244.

Once the metadata for the requested content has been obtained by the primary content transfer module 244, primary content transfer module can determine if the user requesting the content through the application 212 has the proper permissions, if the version in the cache 222 on the remote cache server 220 is the current version of the content, the location of the content, etc. An appropriate response can then be returned to the remote client transfer module 226.

This response may include the requested content itself along with metadata, or updated metadata, in the case where the content is not in cache 222 or the version in cache 222 is not the current version. In such cases the received content may be stored or updated in the cache 222 and the metadata stored or updated in DB 228. In one embodiment, before the content is stored or updated in cache 222 it is converted into a format (e.g., Hypertext Markup Language (HTML), eXtensible Markup Language (XML), PDF, etc.) that is used to present the content to the user by the application 212. Such a conversion may be accomplished, for example, using a document conversion (DCS) module 224 at the remote cache server 220.

If primary content transfer module 244 determines that the requested content should be returned to the remote client transfer module 226 but that the content is stored at a remote platform 250 the response may include the metadata for the requested content and a redirect such that remote client transfer module 226 is redirected to the remote platform 250 on which the requests content is located. In this manner, remote client transfer module 226 may obtain the requested content directly from the remote provider 250 where the content is stored, obviating the need for primary content transfer module 244 to obtain the content from the repository platform 250 itself.

The response from primary content transfer module 244 may also confirm that the version of the content in cache 222 is current and may be provided to the user. The remote client transfer module 226 can then obtain the content from the cache 222 directly.

Once the content is received or obtained by the remote client transfer module 226 it can then be provided to the cache client interface 225 which, in turn, may provide the requested content to the requesting application 212 for access by the user.

Alternatively, the response from primary content transfer module 244 may include a denial of permission for the user to access the requested content. A response can then be returned to the user (e.g., through the cache client interface 225 and application 212) that the user has been denied permission.

In certain cases, however, primary server 240 may experience downtime or network 230 may be slow or otherwise unavailable. In such cases, the cached version of content stored in the cache 222 may be made available to the users of the site 210 by the remote cache server 220 (e.g., if any version of the requested content is available in cache 222).

Here, cache client interface 225 may receive a request for content from a user using an application 212 and make a request for the content to remote client transfer module 226. Remote client transfer module 226 can then send an appropriate request to primary content transfer module 244. The request may include an identifier or version (e.g., the version of the content if it exists in cache 222) for the content, an identifier for the user, or other information. This request may be formatted according to a format utilized by primary content transfer module 244. If no response is received from the primary content transfer module 244 or generally from the primary server 240 in a certain time period the remote client transfer module 226 may determine that the primary server 240 is unavailable.

Additionally, in one embodiment the remote client transfer module 226 may maintain a heartbeat or other type of status communication with primary content transfer module 244 or generally with the primary server 240. For example, the remote client transfer module 226 may send a communication requesting a response to primary content transfer module 244 on primary server 240 at some interval. If a response to the communication is not received from primary content transfer module 244 or primary server 240 within a certain time period, or for multiple of these communications, the remote client transfer module 226 may determine that the primary server 240 is unavailable until such a time as one or more responses is received to a subsequent communication from the remote client transfer module 226.

If the primary server 240 is determined to be unavailable (or before or during such a determination) the remote client transfer module 226 can determine if a version of the requested content is resident in cache 222 (e.g., using the metadata in DB 228). If a version of the requested content does not exist in the cache 222 and the primary server is determined to be unavailable, the remote client transfer module 226 can reply to the cache client interface 225 that the primary server 240 is unavailable and the content is unavailable. The cache client interface 225 can then reply to the user through the application 212 that the requested content is unavailable.

If, however, a version of the requested content does exist in the cache 222 and the primary server 240 is determined to be unavailable the remote client transfer module 226 can reply to the cache client interface 225 that the primary server 240 is unavailable and the content is available along with the location of the content in the cache 222.

The cache client interface 225 can then reply to the user through the application 212 or an independent interface informing the user that the requested content is unavailable, informing the user that a version of the content is available locally and providing the user the ability to access the local version of the content (in the cache 222). The user can then be allowed to access the local version of the requested content in the cache 222. In one embodiment, the user may be granted only read access to such content to facilitate multiple users' access to the content or to ensure that synchronization or version issues are not encountered when primary server 240 once again becomes available.

In one embodiment, the metadata in DB 228 may include associated permissions for the content in cache 222. By storing such permissions, a requesting user's permission may be checked against the permissions associated with the requested content and stored in DB 228 by remote client transfer module 226 or cache client interface 225. Access to the local copy of the requested content stored in cache 222 may then be granted to the user if the user is allowed to access the requested content based on the locally stored permissions in DB 228.

In a particular embodiment, permissions may be managed utilizing a directory server such as Active Directory or OpenText Directory Services (OTDS). The directory server (not shown) may be utilized to authenticate all users of the primary server 240. At those remote sites 210, or in conjunction with remote cache server 220, a federated directory server, such as an OTDS replication server or the like will be deployed and connected to the primary directory server utilized with the primary server 240. The primary and replication directory servers may keep their data synchronized through periodic updates automatically. The primary directory server (e.g., primary OTDS) is connected to an entity's enterprise directory (e.g., Microsoft Active Directory/LDAPv3 server) and will update the replication server(s) as needed. In the event there is a temporary network interruption, the primary directory server will resume updating the replication servers as soon as the network is available again.

It will be noted that cache 222 may be subject to one or more replacement policies by which content in the cache 222 may be replaced, overwritten, moved, deleted, etc. In certain embodiments, an administrator or other user associated with site 210 with certain privileges (collectively administrator), may be provided the ability to designate content, including particular files or folders as cached content not subject to the replacement policy. The designated content may be requested from the primary server 240, placed in the cache 222 and not removed from the cache 222 until specified by an administrator. In this manner, local access to the designated content may substantially always be available regardless of the availability of primary server 240.

In particular, in some embodiments an interface may be offered through an application 212 or the like by which an administrator may designate one or more locations, such as file or folders for content managed by primary server 240, for residency in the cache 222 (e.g., not subject to a content replacement policy or otherwise to remain in the cache 222 until selected for removal).

Remote client transfer module 226 can then utilize the metadata in DB 228 to determine if the designated content is in cache and if it is what the version number, identifier, etc. for that content is, without accessing the content in cache 222 itself. Remote client transfer module 226 can then send an appropriate request to primary content transfer module 244. The request may include an identifier or version (e.g., the version of the content if it exists in cache 222) for the designated content or other information.

The remote client transfer module 226 may receive the requested designated content itself along with metadata, or updated metadata, in the case where the content is not in cache 222 or the version in cache 222 is not the current version. In such cases, the received content may be stored or updated in the cache 222 and the metadata stored or updated in DB 228. In particular, it can be noted (e.g., a flag set or a field designated) with respect to metadata associated with the designated content in DB 228 that the content should not be removed from cache 222. Additionally, to ensure that this designated content remains synchronized with the content as maintained at primary server 240 at some interval the remote client transfer module 226 may process metadata 228 in DB 228 to determine metadata for the designated content and then utilize the metadata in DB 228 to send a request to primary content transfer module 244 for that designated content with the version number, identifier, etc. for that content. If updated metadata or an updated version of the designated content is received from the primary server 240 by the remote client transfer module 226 the designated content can be updated in the cache 222 or the metadata in DB 228 associated with the designated content can be updated.

In this manner, if this designated content is requested by a user through application 212 and the primary server is determined to be unavailable, the remote client transfer module 226 can reply to the cache client interface 225 that the primary server 240 is unavailable and the content is available, along with the location of the designated content in the cache 222. The cache client interface 225 can then reply to the user through the application 212 or an independent interface informing the user that the requested content is unavailable, informing the user that a version of the content is available locally and providing the user the ability to access the local version of the designated content (in the cache 222). The user can then be allowed to access the local version of the requested designated content in the cache 222.

It should be noted here that while certain modules, applications, modules, etc. have been depicted in conjunction with certain servers herein, it will be realized that this is for purposes of illustrations only and that such modules, applications, modules, etc. may be distributed differently or reside at other locations. It may thus be helpful to an understanding of embodiments of the distributed remote caching systems presented herein to discuss more details of certain embodiments of architectures for such caching systems.

Figure 3:
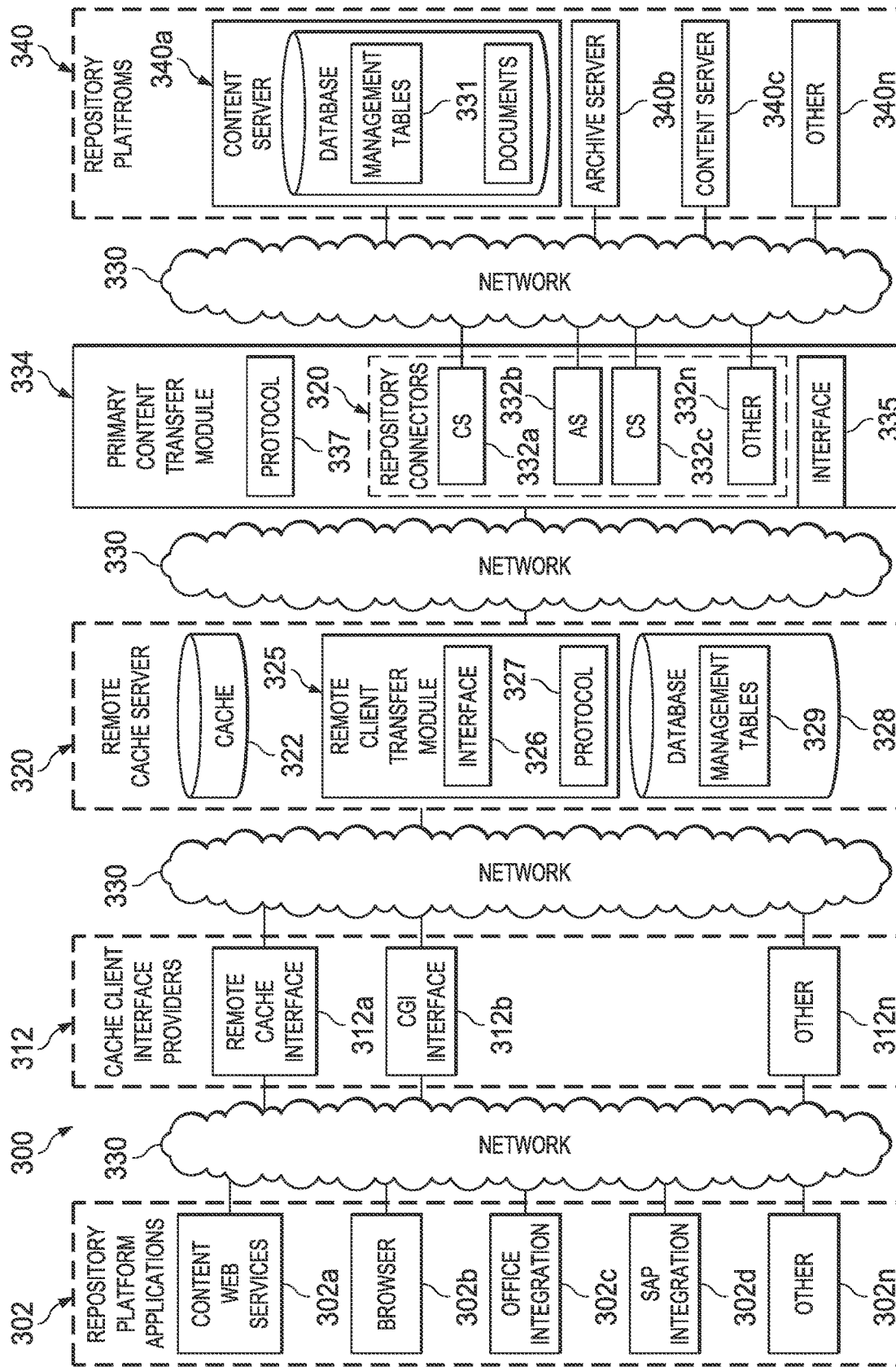
FIG. 3 depicts a diagrammatic representation of an embodiment of a system and architecture for caching in a distributed environment.

Turning then to FIG. 3, a representation of an embodiment of a system and architecture for caching in a distributed environment is depicted. Architecture 300 includes one or more repository platform applications 302, one or more cache client interface providers 312, one or more remote client cache servers 320, one or more primary content transfer modules 334 and one or more repository platforms 340 deployed in a distributed manner and configured to communicate over network 330. Thus, it will be noted specifically that primary content transfer module 334 may be deployed remotely from and configured to work with multiple repository platforms 330 and multiple deployed remote cache servers 320.

Remote client transfer module 325 and primary content transfer module 334 may cooperate to store content managed (including stored) by a repository platform 340 in the cache 322 at the remote cache server 320. The content stored in the cache 322 at the remote cache server 322 provide quicker access to the content managed by the repository platform 340. Remote client transfer module 325 and primary content transfer module 334 also cooperate to keep content in cache 322 synchronized with the content managed at by the repository platform 340. Accordingly, remote client transfer module 325 and primary content transfer module 334 may communicate metadata or content between themselves to accomplish this synchronization. In one embodiment, the transfer of content may occur according to a particular protocol utilized by remote client transfer module 325 and primary content transfer module 334, and implemented through protocol modules 327 and 337, to increase both the speed and reliability of the transfer of content between the remote client transfer module 325 and primary content transfer module 334.

As a result, content may be more quickly and reliably accessed by users utilizing repository platform applications 302. These repository platform applications 302 may include applications that may be deployed in a remote site or on a user's device within the remote site and be configured to be clients of a type of repository platform 340 to allow a user to access content managed by that repository platform 340. For example, content web services 302a may be an application that uses web services to allow a user to access managed content, browser application 302b may be an application or interface configured to be executed or rendered by a browser to allow a user to access content managed by a repository platform 340. Office integration application 302c may be a plug-in or other application that may be utilized with Microsoft Office Applications (e.g., Word) to allow content managed by a repository platform 340 to be accessed. Similarly, SAP integration application 302d may be an application designed to integrate with a repository platform 340 using interfaces or associated with SAP (e.g., SAP SE of Walldorf, Germany). Other application 302n (e.g., deployed differently or designed to integrate with different repository platforms 340) may be utilized.

Cache client interface providers 312 include one or more modules 312 configured to accept and respond to requests from applications 302, where each of the modules 312 may be configured for a particular type of request. For example, remote cache (RC) interface 312a may be configured for requests that correspond to a remote caching systems that an application 312 is configured to utilize. For example, one or more repository platform applications 302 may be configured to utilize a caching platform such as OpenText's cache server or the like. Thus, the remote cache interface 312a may be configured to accept requests in the format utilized by the caching platform such that these requests may be implemented in conjunction with embodiments of the distributed remote caching architecture through remote cache server 320 and primary content transfer module 334 without alteration or modification of repository platform applications 302.

Common gateway interface 312b may be configured for requests are received through a hyper-text transfer protocol (HTTP) to a particular URL. Thus, the CGI interface 312b may include, or be implemented with, an HTTP server such that when requests are made for a particular URL these requests may be implemented in conjunction with embodiments of the distributed remote caching architecture as described herein through remote cache server 320 and primary content transfer module 334. In particular, the requested action may be identified in the query string of the URL used to access CGI interface 312.

Other modules 302n configured to handle requests from other types of repository platform applications 302 utilizing different format are also contemplated.

Remote cache server 320, which may be one or more servers deployed at a remote site, includes a remote client transfer module 325 utilizing cache 322 and DB 328. Remote client transfer module 325 is configured to accept and response requests from cache client interface providers 312 (or directly from repository platform applications 302 or another requestor) through interface 326. In one embodiment, remote client transfer module 325 may be a web based application such as those written in Java or C++ executing on a web server such as Apache Tomcat or the like, while interface 326 may, for example, be a REST interface.

Remote client transfer module 325 is configured to issue requests and accept responses from primary content transfer module 334 (e.g., based on requests received through interface 326) and return responses to requests received through interface 326. Cache 322 is used to store cached versions of the content managed by repository platforms 340 and DB 328 is used to store corresponding metadata for the cached content in cache 322. Thus, content in cache 322 may have corresponding metadata in DB 328 and the metadata in DB 328 and the content in cache 322 may be searched, manipulated, or otherwise accessed independently from one another. Such metadata may include, for example, the type of content, size, author, location in cache 322, version number, identifier (e.g., identifier of, or used by, repository platform 340), etc.

In one particular embodiment, the metadata in DB 328 stored for content in cache 322 (or a portion thereof) may substantially mirror a portion of the metadata maintained by the primary repository platform 340 storing and managing the content. For example, the metadata stored in DB 328 for content managed by content server 340 may include one or more management (MGMT) tables 329 that are duplicative or a subset of MGMT tables 331 maintained by content server 340a.

To illustrate a specific embodiment, for a particular piece of content, a component may be used to manage all versions or renditions of the content while a particular version or rendition of the content may be managed using a particular document. Thus, each component may be one or more associated documents that are versions or renditions of the document associated with that component. As such, these MGMT tables 329 may include a table for component information (referred to as a comp_data table), a table for content server specific information for a component (referred to as a CS_comp_data table) and a table for a document associated with a component (referred to as a CS_docs table).

Accordingly, for a particular piece of content, an entry in a component table may be used to manage all versions or renditions of the content while a particular version or rendition of the content may be managed using an entry in document table. Each component may have one entry in the comp_data table or the CS_comp_data table and that entry associated with one or more entries in the CS_docs table representing the versions or renditions of the document associated with that component.

For example, while other data may be maintained in association with such MGMT tables 329, in one embodiment, the following information may be included in the respective tables:

COMP_DATA
Columns:
ID—auto-increment
COMP_KEY_AS—internal unique component ID defined for Archive Server system type
COMP_KEY_CS—internal unique component ID defined for Content Server system type
CONTENT_SIZE—size of the content
MIME_TYPE—mime type
CACHE_PATH—path to the file in cache folder where the content is stored
UPLOAD_STATE—a status reflecting content uploaded, content downloaded, content partially uploaded, content partially downloaded, scheduled for store and forward.
ENCRYPTION_KEY_ID—id for the key in a DOC_SYSTEM_KEYS table used to encrypt the document key. If content is not encrypted the value is −1
ENCRYPTED_KEY_LENGTH—length of the document key. If document is not encrypted the value is 0.
TIME_STAMP—timestamp when the row was last accessed
REMARK—used in migration operation only.
CS_COMP_DATA
Columns:
COMP_KEY—internal unique component ID
COMPONENT_ID—component ID defined by Content Server
VERSION—version number
RENDITION—rendition
PLATFORM_TYPE—platform ID specific to the primary system
PROVIDER_ID—provider ID specific to the primary system
FILE_NAME—name of the file that was uploaded
DOWNLOAD_HEADERS—headers that should be set for a download request
DOCUMENT_KEY—document key that contains this component (see CS_DOCS table)
MTIME—modification time
CTIME—creation time
VER_MAJOR—major version number as defined by Content Server
VER_MINOR—minor version number as defined by Content Server
TIME_STAMP—timestamp when the row was last accessed
CS_DOCS
Columns:
DOCUMENT_ID—document ID as defined by Content Server
NAME—name
PARENT_ID—parent ID
DEFAULT_COMPONENT_ID—default component (or default version)
PUBLIC_ACCESS
  1 document is public
  0 document is not public
DOCUMENT_KEY—internal unique document ID
POPULATED
  1 the document arrived in cache through Populate/Subscribe operation
  0 the document arrived in cache through normal download request
ADV_VERSION_CONTROL—if document might have major/minor versions
TIME_STAMP—time stamp when the document was last accessed.

Referring still to FIG. 3, primary content transfer module 334 may be configured to accept and respond to a request from the remote client transfer module 325 through interface 335. Specifically, primary content transfer module 334 may accept requests and access one or more repository platforms 340 to respond to such requests. In one embodiment, primary content transfer module 334 may be a web based application such as those written in Java or C++ executing on a web server such as Apache Tomcat or the like, while interface 335 may, for example, be a REST interface.

Repository platforms 340, as discussed above, may be any storage or content management platform such as for example, OpenText's Content Server 340*a*, 340*c* or OpenText's Archive Server 340*b*. Other repository platforms 340*n* are also contemplated. Such repository platforms 340 may accept and respond to requests associated with managed content. The managed content may be stored locally on the repository platform 340 or may be stored on another repository platform 340.

As described above, to insure that remote caching systems as disclosed herein may be utilized with different types of repository platforms 340 being utilized as a primary content management server one or more repository connectors 332 may be utilized be primary content transfer module 334. Each repository connector 332 is configured to receive requests and issue requests associated with the requested functionality to a corresponding type of repository server 340. For example, repository connector 332*a*, 332*c* may be configured for use with OpenText's Content Server while repository connector 332*b* may be configured for use with OpenText's Archive Server. Repository connectors 332*n* configured for use with other types of repository platforms are also contemplated.

In certain embodiments, such repository connectors 332 may be instantiated or deployed for each repository platform 340 with which the primary content transfer module 344 is to be utilized such that there may be a one to one correspondence with repository connectors and repository platforms being utilized with the primary content transfer module 344. Here, for example, repository connector 332*a* may be used with repository platform 340*a*, repository connector 332*b* may be used with repository platform 340*b*, etc.

It will now be helpful to an understanding of certain embodiments to discuss methods that may be employed in architectures such as those depicted in FIG. 2 or 3 above in order to efficiently implement remote caching in such environments. Referring now to FIGS. 4A-4E one embodiment of a method of accessing and caching managed content in a distributed network environment utilizing remote caching is depicted.

Figure 4A:
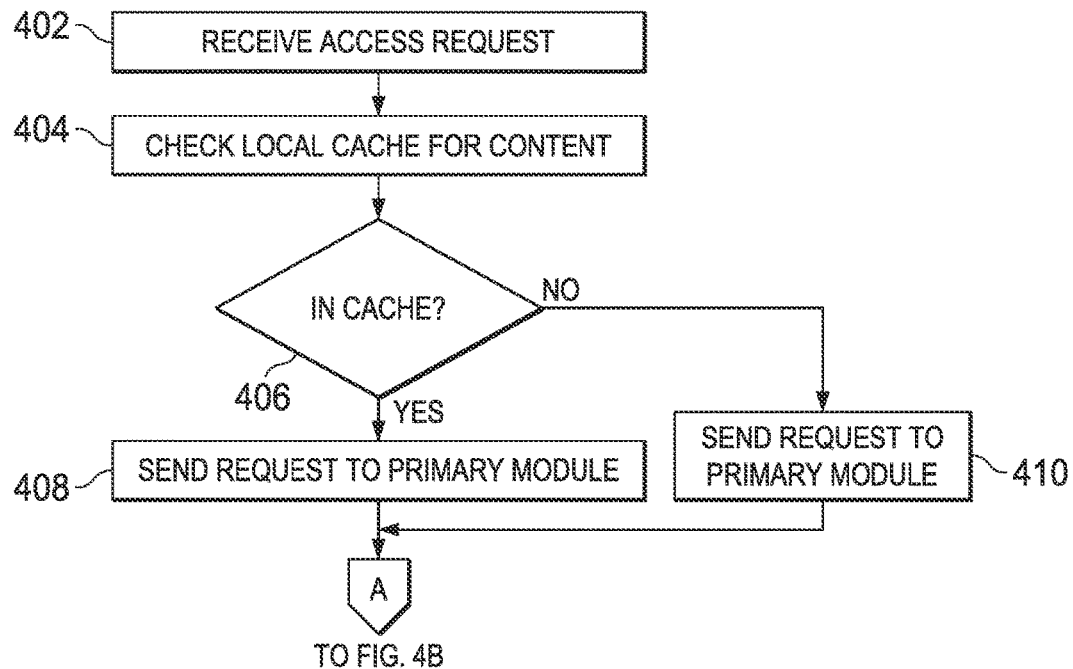
FIGS. 4A, 4B, 4C, 4D and 4E depict flow diagrams for embodiments of methods utilized in caching managed content in a distributed environment.

Looking first at FIG. 4A, at step 402 an access request (also referred to as a download, open or retrieval request) can be received. The request may include an identifier for the type of request being performed, the desired content, an identifier or location of a primary content server, user information, or other data. Such a request may, for example, be initiated by a user interacting with a repository platform application 302 on his device and indicating that he wishes to open or edit certain content such as a document, version of a document, most recent version of a component, or the like. This request is intended for a particular repository platform 340 which manages the content (which can be considered the primary content management platform for this request).

When platform application 302 issues the request it is intercepted or received at a cache module client 312 (e.g., CGI interface 312b) at a remote cache server 320 for the user's site that is associated with the repository server 340 that is the primary content management server. Alternatively, the request from the application 302 may be issued as a request to a remote cache service or server associated with a particular repository platform 340 which manages the content. In this case, the request may be intercepted by a cache module client 312 (e.g., remote cache interface 312a) associated with the remote cache service.

For example, a requested action (e.g., access) may be determined by an argument in the query string received by the CGI interface 312b. A URL (or portion thereof) received at CGI interface 312 may look like: http://nionescu-t.opentext.net/OTCS/cs.exe?func=11&objId=8042&objAction=download&viewType=1. The "objAction" argument may specify the requested operation. Thus, if the value for such an argument is "download", "downloadrenditionaction", "doc.fetch", "doc.view", etc. CGI interface 312b may determine that an access to a document requiring retrieving or providing the document is what is being requested. Other arguments may include an identifier for a document (or component) and version, among other arguments.

Once it is determined that the request is an access request, one or more requests to implement the received request can then be formatted according to the interface 326 provided by remote client transfer module 325 and issued to the remote client transfer module 325 through the interface 326. Again, the request(s) issued to the remote client transfer module 325 may include an identifier for the type of request being performed, the desired content, an identifier or location of a primary content server, user information, or other data.

In one embodiment, interface 326 of remote client transfer module 325 may be a REST interface using the HTTP protocol, such that requests for operations on components or documents can be received using the HTTP GET or HTTP POST commands with an associated URL string (or portion thereof). The following are examples of an interface that may be utilized with an embodiment of an interface 326 of a remote client transfer module:

| Component: Operations on a component | | |
|---|---|---|
| Command | URL String | Description |
| GET | /component/{component_id}/cache | Get information about the specified component. Only the metadata may be returned not the content. The information may be taken from the local cache 322. |
| POST | /component/{component_id}/contents | Upload a component stream. |
| GET | /component/{component_id}/contents | Get the stream of a component of a document. |
| POST | /component | Create a component object. |
| GET | /component/{component_id} | Get information about the specified component. Only the metadata may be returned not the content. |

| Document: Operations on a document object | | |
|---|---|---|
| Command | URL String | Description |
| GET | /document/{document_id} | Get a document object by identifier. Only the metadata may be returned not the content. |
| DELETE | /document/{document_id} | Delete a document. |
| POST | /document/{document_id}/promote_version | Promote a Document Version. |
| POST | /document | Create a document. |
| POST | /document/{document_id}/version | Create a component object. |
| GET | /document/{document_id}/version/data | Get the content of a specific version of the specified document. |
| GET | /document/{document_id}/version/metadata | Get information about a specific version of the specified document. Only the metadata may be returned not the content. |
| GET | /document/{document_id}/version/metadata/cache | Get information about a specific version of the specified document. Only the metadata may be returned not the content. The information may be taken from local cache 322. |

-continued

Document: Operations on a document object

| Command | URL String | Description |
| --- | --- | --- |
| GET | /document/{document_id}/store-and-forward | Get information if the components of the specified document are marked for Store and Forward. Only the metadata may be returned not the content. |

Upon receiving the request, the cache 322 at remote caching server 320 may be checked for the requested content (or a version thereof) at step 404. For example, client side transfer module 325 may access the DB 328 using the identifier in the received request to determine if the requested content is in cache 322. As the metadata in DB 328 is separated from content in cache 322 the search of the metadata may be relatively efficient.

Specifically, for example, a component identifier, document identifier or version identifier, can be determined from the received request and it can be determined if there are MGMT tables 329, or rows in such tables, (such as a comp_data, comp_cs or cs_docs table) associated with the determined identifier(s). Accordingly, based on the presence of metadata 328 associated with the requested content, then, it can be determined at step 404 if the requested content (or a version thereof) is in cache 322.

Based on the presence of the requested content (or version thereof) in the cache one or more request(s) may be formed according to interface 335 of the primary content transfer module 334 and sent to the primary content transfer module 334. Specifically, if metadata associated with the requested content can be located in DB 328 (e.g., a version of the requested content is the local cache 322) a request to the primary content transfer module 334 including, for example, the identifier for the component, document or version requested, the access requested, an identifier for the user who issued the request and a version identifier for the version (or most recent version) of the content currently in the cache 322 (which may be obtained from the metadata for the requested content, such as the VERSION field of the cs_comp_data table) may be formed and sent at step 408.

Alternatively, if no metadata associated with the requested content can be located in DB 328 (e.g., there are no rows of MGMT tables 329 associated with the component, document or version identifier as the content is not in the local cache 322) a request to the primary content transfer module 334 including the identifier for the requested component, document or version, the access requested and an identifier for the user who issued the request may be formed and sent at step 410. In any event, it will be noted that in certain embodiments a single request may be sent to primary content transfer module 334 (e.g., by remote client transfer module 325).

In one embodiment, when a request is sent to primary content transfer module 334 an indication of the pending request is maintained in association with metadata in DB 328 for the requested content (if it exists). Thus, when a request is sent to the primary content transfer module 334 for the content, a flag or other indicator that such a request is pending may be stored in metadata associated with the content (and cleared when a response is received). This indicator may indicate for example that a request is in progress, has been completed, that only metadata for the content exists in the cache or another status. Accordingly, before a request is sent to the primary content transfer module for the content any metadata associated with the content identifier may be checked to determine the status of this indicator and if a request associated with the content is outstanding another request may not be sent. In certain embodiments, a pending queue of outstanding requests may be maintained such that only one request to the primary content transfer module 334 may be sent for each pending request for the same content.

Figure 4B:
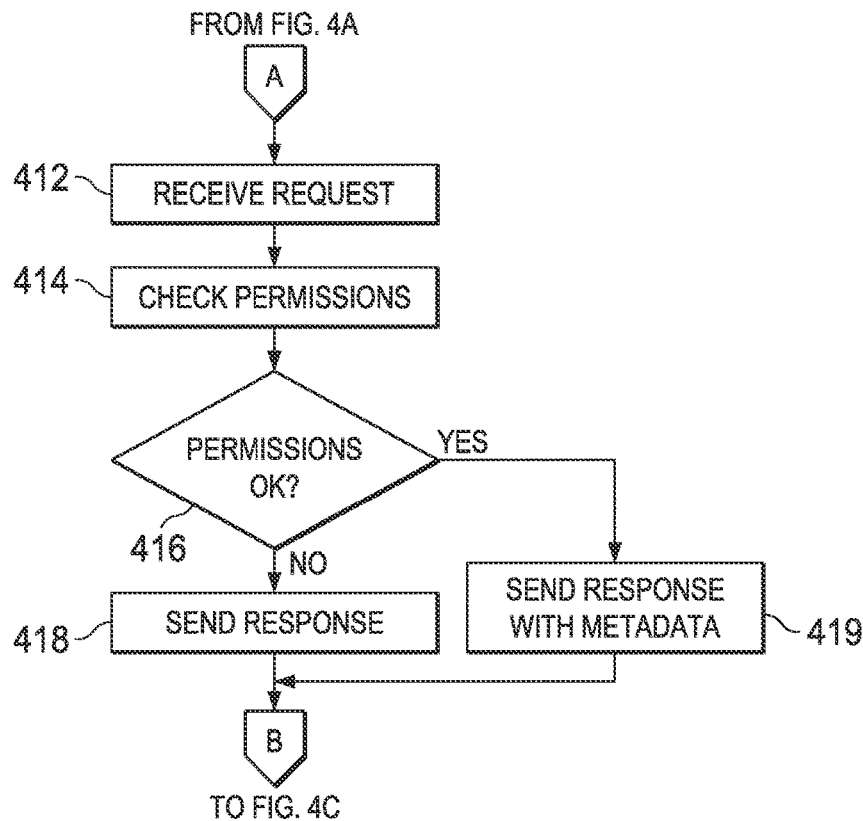

Continuing with FIG. 4B, this request issued by the remote client transfer module can be received at step 412. For example, the request issued by the remote client transfer module 325 may be received at the primary content transfer module 334. When the request is received the primary content transfer module 334 may obtain the metadata associated with the requested content maintained by the primary content management server (e.g., repository platform 340) that manages the requested content. Thus, primary content transfer module 334 may issue a request to the repository platform 340 that is the primary content management server for the requested content to obtain the metadata maintained by that repository server 340 for that content. This request may be issued through a repository connector 332 associated with that repository server 340.

Using the metadata obtained on the requested content from the primary content management server for that content the permissions may be checked at step 414. In particular, primary content transfer module 334 can determine if the user who issued the initial request has appropriate permission to perform the requested access on the requested content. In one embodiment, this can be done by obtaining permissions associated with the user using the identifier for the user included in the received request and the metadata on the requested content obtained from the primary content management server 340. If the requesting user does not have appropriate permissions for the requested access on the requested content at step 416 a response may be sent to remote client transfer module 325 indicating the user's request should be denied at step 418.

If, at step 416 the user does have appropriate permissions the metadata for the current version of the requested content stored on primary content management server (e.g., repository platform 340) can be returned from the primary content transfer module 334 to remote client transfer module 325 at step 419 in response to the request.

Figure 4C:
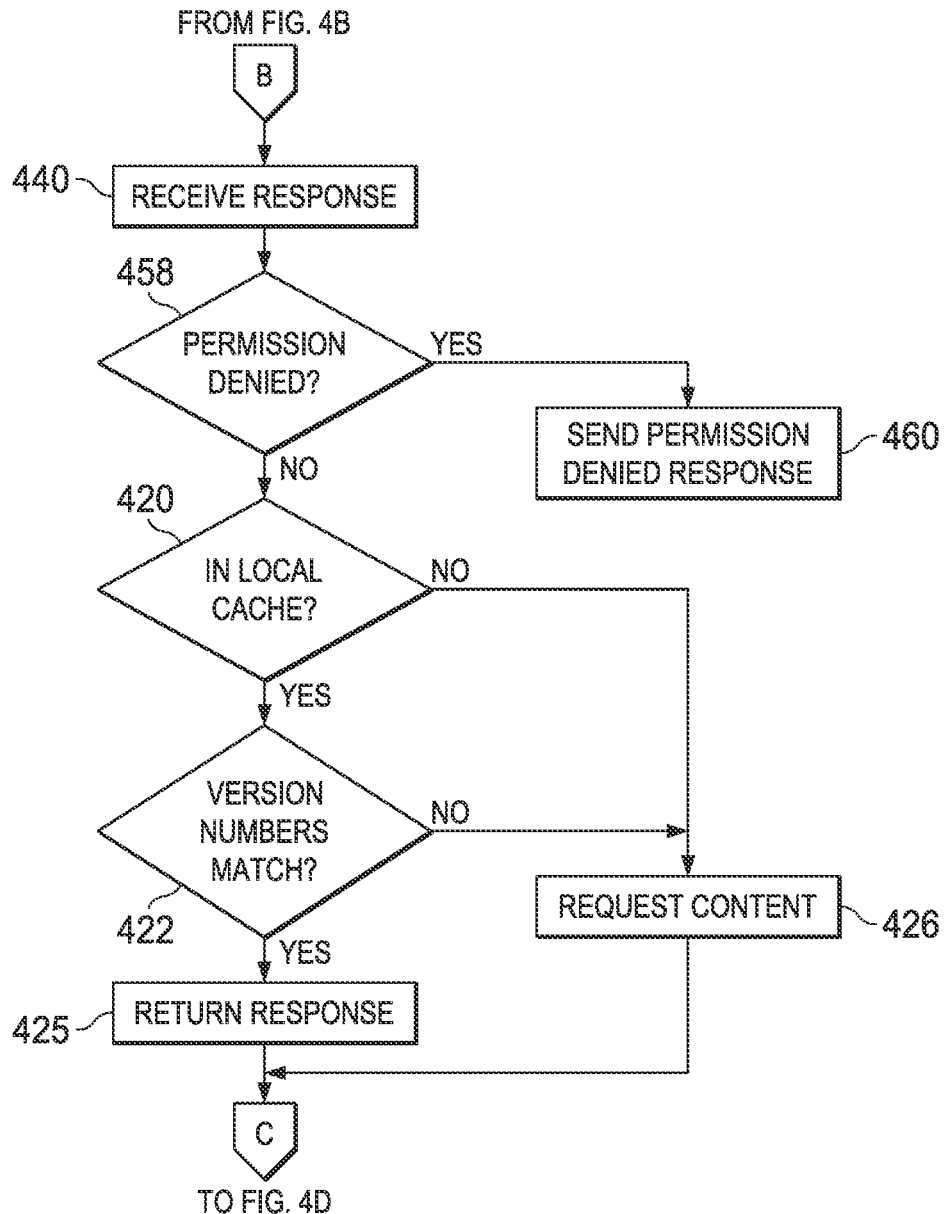

Moving on to FIG. 4C, at step 458 when the response is received from the primary content transfer module 334 the remote client transfer module 325 can determine if the response indicates that permission has been denied for the user to perform the requested access on the requested content. If the user does not have appropriate permissions for the requested access on the requested content at step 458 the remote client transfer module 325 at step 460 will then send a response (e.g., through client interface provider 312) to the requesting platform application 302 which may, for example, present an error message to the user.

If the response from the primary content transfer module 334 includes metadata for the requested content at step 420 the remote client transfer module 325 can determine if the requested content is in cache 322 at the remote cache server. This determination can be made, for example, based on the received response. For example, if the response received from the remote client transfer module 325 includes a version identifier for the content it can be determined if there is version of the requested content already in cache 322 at the remote cache server and if the version of the requested content matches the version number of the current version of the content (as stored on primary content management server) by for example, comparing the content, document or version identifier received in the response (or other received metadata) to the corresponding fields in MGMT tables 329 on the remote cache server 320.

If the version numbers match at step 422 the remote client transfer module 325 will then, at step 424, send a response (e.g., through cache client interface 312). Such a response may allow the user to access the content in the cache 322 (and which may include the actual requested content itself) to the requesting platform application 302 which may, for example, present the content for access to the user.

If it is determined either that there is no version of the requested content in the local cache 322 at the remote cache server at step 420 or that the version in the local cache is not current at step 422, the content itself may be requested from the primary content transfer module 334. Thus, at step 425, the remote client transfer module 325 may request the content from the primary content transfer module 334. This request may indicate an identifier for the component, document or version requested. Additionally, remote client transfer module 325 may update a status associated with the content reflecting that the content is to be transferred (e.g., downloaded to the remote client transfer module 325). In one embodiment, for example, the remote client transfer module 325 may update the UPLOAD_STATE column of the row in the comp_data table associated with the content with status to reflect that the content is being partially downloaded or the like. In this manner, if there is an error before the content has been completely downloaded the content (or portions thereof) may be re-requested from the primary content transfer module 334.

Figure 4D:
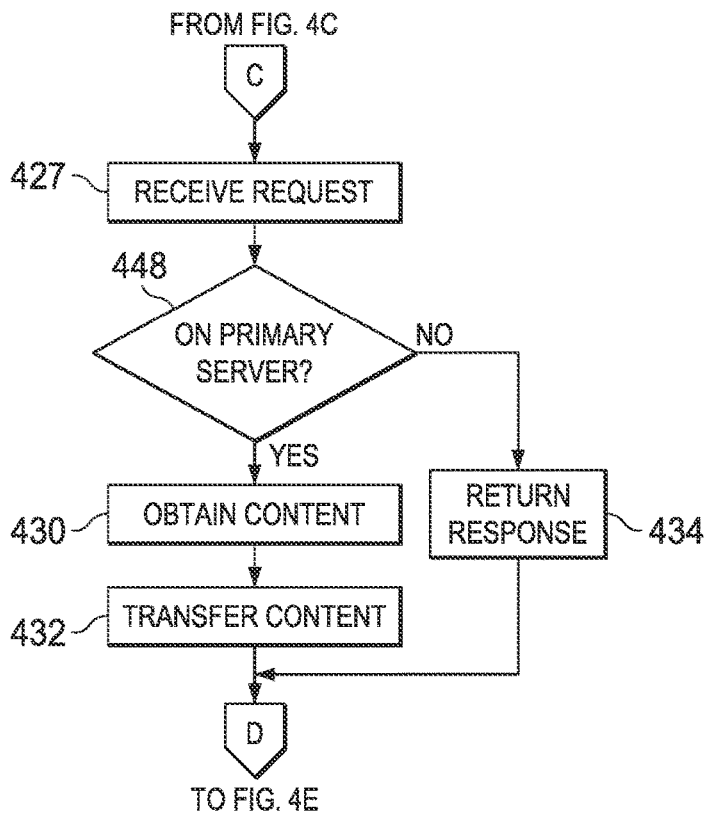

Moving to FIG. 4D, the request for the content may be received at step 427. As discussed, content may be managed by a primary content management server that is actually stored by another repository platform 340. Thus, using metadata on the requested content obtained from the primary content management server the primary content transfer management module 334 can determine if that content is stored on the primary content management server or on another repository platform 340 associated with the primary content management platform.

If the content is stored on the primary content management server at step 448 the content may be obtained by the primary content transfer module 334 from the primary content server at step 430. Obtaining the content may include sending a request with the identifier for the content (e.g., an identifier for the component, document or version) to the repository platform 340 serving as the primary content management server through an appropriate repository connector 332. At step 432 then the obtained document and metadata associated with the content may be transferred to the client side transfer module 325. In one embodiment, the transfer of the content between the remote client transfer module 325 and the primary content transfer module 334 may be performed according to a particular protocol that utilizes a number of operating threads to request or transfer the content, as will be explained in more detail at a later point herein.

If the requested content is stored on another repository platform 340 (e.g., not the primary content management server) a response may be formed and sent at step 434 where the response includes a resource locator associated with that repository platform and the requested content (e.g., a URL or universal resource indicator (URI)). Specifically, the metadata obtained from the primary content management server may contain sufficient information to identify both the location of the repository platform 340 storing the requested content and an identifier for the content associated with that repository platform 340. A response, including for example, a resource locator for the content may thus be created. In some embodiments, the response may also include metadata associated with the requested content, such that metadata associated with the content may be updated in DB 328. Alternatively, the metadata for the content may be sent in one response while the content or resource locator for the content may be sent a separate response.

Figure 4E:
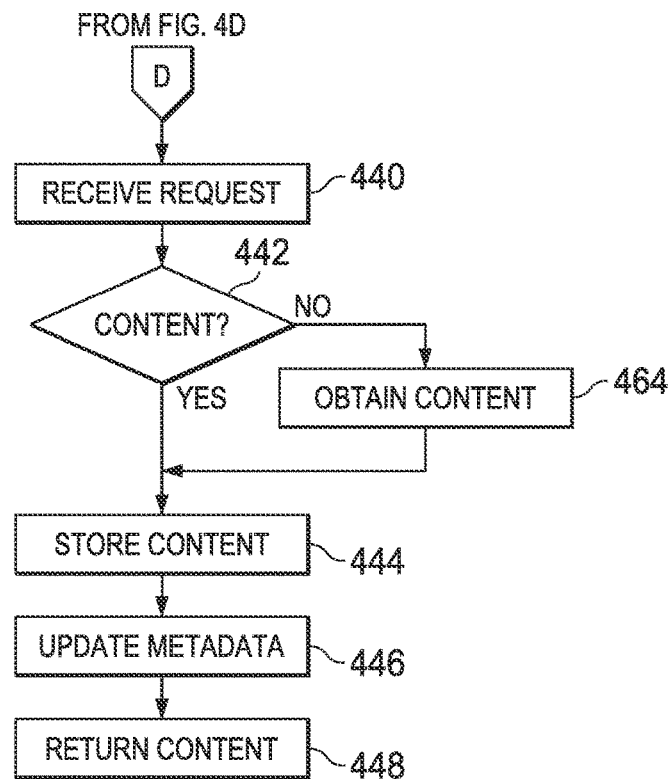

Looking now at FIG. 4E, when the client side transfer module 325 at the remote cache server receives a response from the primary content transfer module 334 at step 440 it can determine if the requested content is included in the response at step 442 (or if the requested content has been transferred in response to the request). Such a determination may be made, for example, by accessing and determining a value of the UPLOAD_STATE field of the row in the comp_data table associated with the requested content. If the content has been transferred (e.g., the content that is new content that was not previously stored in cache 322 at the remote cache server or the version in the cache 322 at the remote cache server was not the most current version) the transferred content may be stored in cache 322 at the remote content server at step 444 and the metadata (which may also be received in the response) in the DB 328 may similarly be stored or updated at step 446.

In one embodiment, this may include the creation of one or more new entries in the comp_data, cs_comp_data or cs-docs table of MGMT tables 329 or the updating of data in an existing row of those tables. In instances where a new version of content already stored in cache 322 is transferred from the primary content transfer module 334, the new version of content may be stored in the cache 322 and a new entry in one or more of those table may be created such that the new version is stored in cache 322 along with the one or more older versions of the content and the versions of the content associated with one another by metadata in DB 328 (e.g., are associated with the same component).

At step 448 the content can then be returned to the requesting user. The remote client transfer module 325 may, for example send a response (e.g., through cache module client 312) allowing the user to access the content in the cache 322 (or which may include the actual requested content itself) to the requesting platform application 302 which may, for example, present the content for access to the user.

If a resource locator is included in the response at step 442 the remote client transfer module 325 may utilize the included resource locator to obtain the content directly from the repository platform associated with the included resource locator at step 464 by, for example, accessing the location specified by the resource locator or sending a request in accordance with the resource locator. Once the content is obtained the returned content may be updated or stored in cache 322 at step 444 and the metadata (which may also be received in the response or may be obtained from the repository platform 340 while directly obtaining the content) in the DB 328 may similarly be stored or updated at step 446. Then, at step 448 the requested content can be returned to the requesting user. The remote client transfer module 325 may, for example send a response (e.g., through cache module client 312) allowing the user to access the content in the cache 322 (or which may include the actual requested content itself) to the requesting platform application 302 which may, for example, present the content for access to the user.

Figure 5:
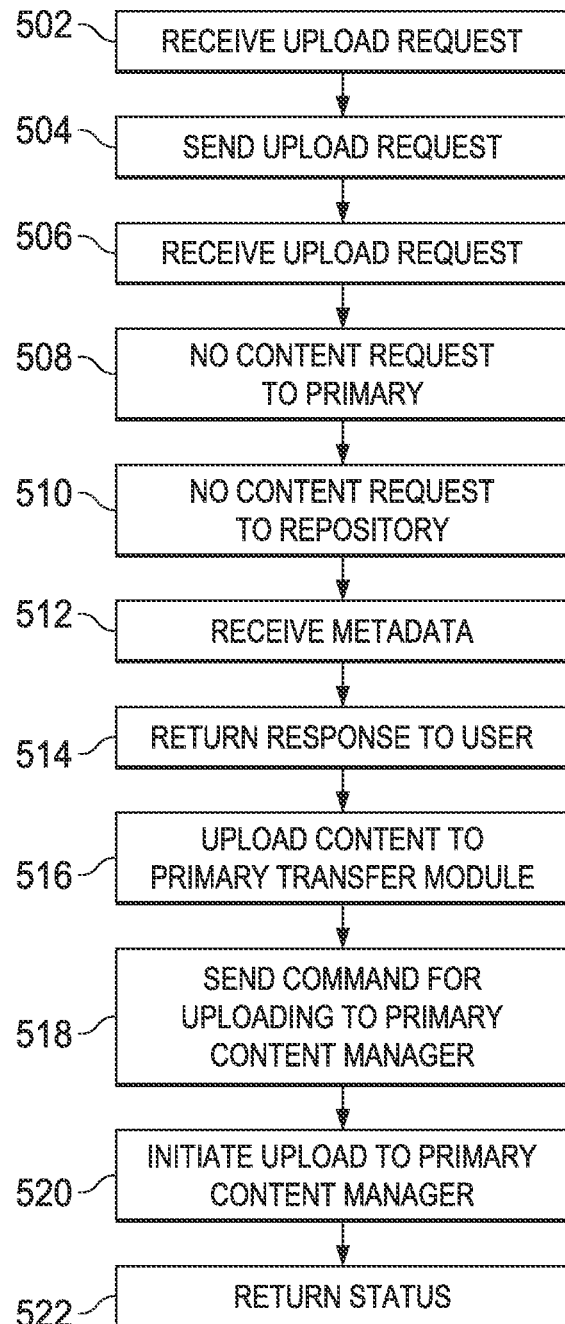
FIG. 5 depicts a flow diagram for an embodiment of a method utilized in caching managed content in a distributed environment.

Moving on to FIG. 5 now, an embodiment of a method of saving or updating managed content in a distributed remote caching environment is depicted. At step 502 an upload request may be received. For example, a user accessing content through a repository platform application 302 may save or close content to which changes have been made (or which may have been newly created) or request that a new version or document be created. In response, the repository platform application 302 may send the new or changed content (or indicators of the changes thereto) in an upload request. The upload request may be received by an appropriate cache module client 312 for the repository platform application.

For example, a requested action (e.g., upload) may be determined by an argument in the query string received by the CGI interface 312b. A URL (or portion thereof) received at CGI interface 312b may look like: http://nionescu-t.opentext.net/OTCS/cs.exe?func=11&objId=8042&objAction=doc.addversion2&viewType=1. The "objAction" argument may specify the requested operation. Thus, if the value for such an argument is "doc.addversion2", "create", "create2", etc. CGI interface 312b may determine that an access to a document requiring uploading the document is what is being requested. Other arguments may include an identifier for a document (or component) and version, and the content itself, among other arguments.

The cache client interface 312, in turn, send an upload request to the remote client transfer module 325 at step 504. For example, the client interface may institute a PSOT with a URL that included /document/{document_id}/version. The POST operation will contain both the metadata for the document and the content itself (e.g., the actual binary of the document). The metadata for example, may include an identifier for the content (e.g., component, document or version), an identifier for the user, a time stamp, a previous or current version number, etc.

Thus, in conjunction with the received upload request the content and associated metadata may be received at step 506 by the remote client transfer module 325. At step 508 then, a request is sent to create a no-content (or stub) for the new document or version on the primary content management server. This request may be sent to the primary content transfer module 334. This request may include only the metadata for the content.

When primary content transfer module 334 receives the request to create a no-content version, the primary content transfer module 334 may send a request, at step 510 to the repository platform 340 (e.g., content server 340a) associated with the content of the received request to create a no-content version. Thus, in response to this request a placeholder may be created on the repository platform 340a. In one embodiment, an entry in one or more MGMT tables 329 may be created and populated with the metadata received in the request along with any additional metadata maintained or generated by the repository platform 340 (e.g., content server 340a). This no-content version will, however, have a size of zero and not be associated with the content itself.

The metadata as created by the repository platform (e.g., for the no-content entry in MGMT tables 329 for content server 340a) can then be returned from the repository platform 340 to the primary content transfer module 334, which, in turn, returns the metadata to the remote client transfer module 325. When remote client transfer module 334 receives the metadata from the primary content transfer module 334 at step 512 it may update the metadata in DB 328 and store the content (as received in the original request from the cache client interface 312) in cache 322.

In one embodiment, the updating of the metadata in DB 328 may include the creation of one or more new entries in the comp_data, cs_comp_data or cs-docs table of MGMT tables 329 or the updating of data in an existing row of those tables. In instances where a new version of content already stored in cache 322 is being created the new version of content may be stored in the cache 322 and a new entry in one or more of those table may be created such that the new version is stored in cache 322 along with the one or more older versions of the content and the versions of the content associated with one another by metadata in DB 328 (e.g., are associated with the same component).

After the content and metadata is stored in the cache 322 and DB 328 at the remote cache server 320 a notification may be sent to the user that the upload has been completed at step 514. In one embodiment, then, the remote client transfer module 325 may complete the storing of content or metadata and send a response indicating the save has been competed to the repository platform application 302 that issued the upload request through the cache module client 312.

Subsequently, at a later point (e.g., after the response to the user is sent at step 514), the content itself may be uploaded to the primary content management server at step 516. Such an upload may include the transfer of content between the remote client transfer module 325 and the primary content transfer module 334. In one embodiment, the transfer of the content between the remote client transfer module 325 and the primary content transfer module 334 may be performed according to a particular protocol that utilizes a number of operating threads to request or transfer the content, as will be explained in more detail at a later point herein.

As may be noticed, a response to the user indicating the content has been uploaded or a new version created may be sent to a user before requested action has actually been accomplished with respect to the primary content management platform (e.g., repository platform 340). Thus, synchronization or creation of the content at the primary content management platform may be made asynchronously to the initial reception and storage of the content at the remote cache server 320. By propagating the content to the primary content management server asynchronously to informing the user that such changes have been saved, the user or application may be allowed to more quickly resume other activities of continue operating as the notification may be sent as soon as the content is saved on the remote cache server 320 (which may be accessed more quickly), ensuring a user does not have to wait on the slower access required to propagate the content to the primary content management server.

This transfer of content from the remote client transfer module 325 to the primary client transfer module 334 may be initiated substantially immediately after the content and metadata are updated in the cache 322 and DB 328 or a response is returned to a user or may occur at a subsequent point. In the latter case (known as store-and-forward), a status associated with the document (e.g., the UPLOAD_STATE of entry in the comp_data table associated with the document in MGMT tables 329) may be kept indicating that the document needs to be uploaded. At some interval a thread (e.g., a store-and-forward thread) may check the status of the documents and initiate the upload for any documents which have a status reflecting that they need to be uploaded.

Once the document is uploaded to the primary client transfer module 334 the remote client transfer module 325 may send a command (e.g., a COMMIT command) at step 518 to primary client transfer module 334 to initiate the upload of content from the primary client transfer module 334 to the primary content management server (e.g., repository platform 340). Primary content transfer module may then, at step 520, initiate the upload of the content from the primary client transfer module 334 to the appropriate repository server 340 and return a status of this upload to the remote client transfer module 325 at step 522.

Specifically, in one embodiment, if the upload of content to the repository server 340 is successful a status associated with the content at the remote cache server 320 (e.g., the UPLOAD_STATE of an entry in the comp_data table associated with the document in MGMT tables 329 in DB 328) may be set to reflect that no action need to be taken with respect to the document.

If an error occurs during upload of content to the repository server 340, the primary content transfer module 334 may attempt to identify the error and if the error is identified as unrecoverable, the status returned to the remote client transfer module 325 at step 522 may indicate an unrecoverable error. In such cases a status associated with the content at the remote cache server 320 (e.g., the UPLOAD_STATE of an entry in the comp_data table associated with the document in MGMT tables 329 in DB 328) may be set to reflect that the content has not been uploaded. If the error cannot be identified the primary content transfer module 334 may attempt repeated (e.g., two or more) uploads. If after a number of attempts errors are still encountered the status returned to the remote client transfer module 325 at step 522 may indicate an unrecoverable error. In such cases a status associated with the content at the remote cache server 320 (e.g., the UPLOAD_STATE of an entry in the comp_data table associated with the document in MGTM tables 329 in DB 328) may be set to reflect that the content has not been uploaded.

It may be useful now to discuss an embodiment of how content may be transferred between remote client transfer module 325 and primary content transfer module 334. In particular, in one embodiment a protocol (e.g., as employed by protocol modules 327 and 337) which utilizes multiple simultaneous thread to transfer the content as chunks may be utilized. Thus, when remote content transfer module 325 wishes to request content from the primary content transfer module 334, protocol module 327 on the remote cache server may be used to request the content from protocol module 337 of the primary content transfer module 334.

In one embodiment, protocol module 327 on the remote cache server 320 includes a master transfer thread that manages the transfer of each document requested. When a request to upload or download a document (a job) is received (e.g., with a component, document or version identifier), the master transfer thread may determine the size of the document to be transferred (e.g., from the metadata in MGMT tables 329 in DB 328 or from the received request) and calculate a number of chunks by dividing the size of the document into a number of equal size chunks (e.g., 64K, 512K, 1 MB, etc.) (where the last chunk may be of smaller size if the content is not evenly divisible among the chunk size).

The master thread at the protocol module 327 may then send a request or other notification to the protocol module 337 at primary content transfer module 337 indicating an upload or download job, the size of the content, number of chunks of the content, metadata associated with the content, including for example, one or more identifiers associated with the content (e.g., component, document or version identifier) or other metadata. In response to this notification, the primary protocol module 337 may obtain the content (e.g., from the repository platform 340) in the case of a download request or create a buffer space or other location to store the content in the case of an upload request.

Master thread at protocol module 327 may then create work items for the job, where a corresponding work item for each of the chunks may be placed in a queue. The work items may be numbered or otherwise identified with a particular chunk of the file and indicate whether the file is to be downloaded or uploaded. Once the work items are placed in the work queue a number of work threads will be started (which may be 8 threads in one embodiment, but could be fewer or more threads in other embodiments) to process the work items.

In the case of content to be downloaded from the remote content primary content transfer module 334, the master thread may mark a status associated with the content as partially downloaded (e.g., the UPLOAD_STATE in the entry of the comp_data table of MGMT tables 329 as content partially downloaded). Additionally, master thread may create a location for where the content is to be stored in cache 322. This location may be updated in metadata in DB 328 (e.g., the CACHE_PATH column in the entry of the comp_data table of MGMT tables 329).

Each work thread then proceeds to obtain a work item associated with a chunk of the file and request that chunk from the corresponding protocol module 337 at the primary content transfer module 334. When the protocol module 337 at the primary content transfer module 334 receives a request for the chunk of the content, it can access the requested chunk of the content at the primary content server module 334 and return the requested chunk to the requesting work thread.

The work thread at protocol module 327 may receive the requested chunk and write the received chunk of the content into the cache 322 at the appropriate location. In particular, as the work thread maintains data indicating the chunk identifier and the chunk size, the work thread may be able to calculate the offset from the beginning of the location where the content is being stored in the cache 322. The work thread can thus store the chunk directly at the proper offset from the beginning of the location in cache 322 created to store the content. Additionally, the work thread may update an indication of which chunks have been downloaded. This indicator may be stored in association with, for example, the entry in the MGMT tables 329 corresponding to the content or may be stored in another location associated with the protocol module 327 or the content being downloaded. In this manner, the chunks of the content that have been successfully downloaded (or which have not been successfully downloaded) may be tracked. Other ways of tracking the successful or unsuccessful download of chunks of the content may also be utilized and are contemplated herein. Once the work thread has stored the chunk and updated the indication that the chunk has been downloaded, the work thread may then obtain another work item off the work queue if any more exist.

If all the chunks of the content are downloaded successfully (e.g., all work items processed by work threads and all chunks are indicated as downloaded), the work threads may be cleaned up (e.g., killed) by the master thread and the master thread may mark the status associated with the content as content downloaded (e.g., the UPLOAD_STATE in the entry of the comp_data table of MGMT tables 329 as content downloaded).

If, however, there is a network interruption or other error during the download of the content, the protocol module 337 may notify the remote client transfer module 325 which may, in turn, provide an error to the user through the appropriate cache client interface 312. In this case, the status associated with the content may remain as partially downloaded (e.g., the UPLOAD_STATE in the entry of the comp_data table of MGMT tables 329) Accordingly, when network connectivity is restored (or any other errors resolved) this status will reflect that the content was partially downloaded. Moreover, as the chunks which have (or have not) been downloaded are tracked, when the download is resumed protocol module 327 may determine which chunks have not been downloaded from the chunk tracking data and only place work items on the queue for those chunks. In this manner, only the chunks not previously downloaded may need to be requested and downloaded to complete the download of the content. It will be noted that, in some embodiments, the completion of the download of the content may not be initiated until such a time as a subsequent access request for that content is received by remote client transfer module 325.

Similarly, then, according to embodiments, in the case of content to be uploaded to the primary content transfer module 334 from the remote client transfer module 325, the master thread may mark a status associated with the content as partially uploaded (e.g., the UPLOAD_STATE in the entry of the comp_data table of MGMT tables 329 as content partially uploaded). Additionally, master thread determine a location for where the content is stored in cache 322 from DB 328 (e.g., the CACHE_PATH column in the entry of the comp_data table of MGMT tables 329).

Each work thread then proceeds to obtain a work item associated with a chunk of the file and obtain that chunk of content from the location in cache 322 where the content is stored. In particular, as the work thread is aware of the chunk identifier and the chunk size, the work thread may be able to calculate the offset from the beginning of the location where the content is being stored in the cache 322. The work thread can thus obtain the desired chunk of data directly at the proper offset from the beginning of the location in cache 322 created to store the content. The work thread may then send the chunk of content (e.g., along with a data or metadata needed to identify the content, the job, etc.) to the protocol module 337 at the primary content transfer module 334.

When the protocol module 337 at the primary content transfer module 334 receives a request for the chunk of the content, it can write the received chunk in the created buffer or storage space for the job and return an indication to the work thread at protocol module 327 that the chunk has been received and stored.

The work thread at protocol module 327 may receive the notification and may update an indication of which chunks have been successfully uploaded. This indicator may be stored in association with, for example, the entry in the MGMT tables 329 corresponding to the content or may be stored in another location associated with the protocol module 327 or the content being uploaded. In this manner, the chunks of the content that have been successfully uploaded (or which have not been successfully uploaded) may be tracked. Once the work thread has updated the indication that the chunk has been uploaded, the work thread may then obtain another work item off the work queue if any more exist.

If all the chunks of the content are uploaded successfully (e.g., all work items processed by work threads and all chunks are indicated as uploaded), the work threads may be cleaned up by the master thread and the master thread may mark the status associated with the content as content downloaded (e.g., the UPLOAD_STATE in the entry of the comp_data table of MGMT tables 329 as content uploaded).

If, however, there is a network interruption or other error the status associated with the content may remain as partially uploaded (e.g., the UPLOAD_STATE in the entry of the comp_data table of MGMT tables 329) Accordingly, when network connectivity is restored (or any other errors resolved) this status will reflect that the content was partially uploaded. Moreover, as the chunks which have (or have not) been uploaded are tracked, when the upload is resumed protocol module 327 may determine which chunks have not been uploaded from the chunk tracking data and only place work items on the queue for those chunks. In this manner, only the chunks not previously uploaded may need to be uploaded to complete the upload of the content. It will be noted here, however, that there may be no need to inform the user that any error has occurred, as a copy of the content has already been stored in cache 322.

Those skilled in the relevant art will appreciate that the invention can be implemented or practiced with other computer system configurations, including without limitation multi-processor systems, network devices, mini-computers, mainframe computers, data processors, and the like. The invention can be embodied in a general purpose computer, or a special purpose computer or data processor that is specifically programmed, configured, or constructed to perform the functions described in detail herein. The invention can also be employed in distributed computing environments, where tasks or modules are performed by remote processing devices, which are linked through a communications network such as a LAN, WAN, and/or the Internet. In a distributed computing environment, program modules or subroutines may be located in both local and remote memory storage devices. These program modules or subroutines may, for example, be stored or distributed on computer-readable media, including magnetic and optically readable and removable computer discs, stored as firmware in chips, as well as distributed electronically over the Internet or over other networks (including wireless networks). Example chips may include Electrically Erasable Programmable Read-Only Memory (EEPROM) chips. Embodiments discussed herein can be implemented in suitable instructions that may reside on a non-transitory computer readable medium, hardware circuitry or the like, or any combination and that may be translatable by one or more server machines. Examples of a non-transitory computer readable medium are provided below in this disclosure.

Although the invention has been described with respect to specific embodiments thereof, these embodiments are merely illustrative, and not restrictive of the invention. Rather, the description is intended to describe illustrative embodiments, features and functions in order to provide a person of ordinary skill in the art context to understand the invention without limiting the invention to any particularly described embodiment, feature or function, including any such embodiment feature or function described in the Abstract or Summary. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention. For example, it will be understood that while embodiments as discussed herein are presented in the context of a browser based application other embodiments may be applied with equal efficacy to other types of components on computing device (e.g., other native components, etc.).

Reference throughout this specification to "one embodiment", "an embodiment", or "a specific embodiment" or similar terminology means that a particular feature, structure, or characteristic described in connection with the embodiment is included in at least one embodiment and may not necessarily be present in all embodiments. Thus, respective appearances of the phrases "in one embodiment", "in an embodiment", or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

Embodiments discussed herein can be implemented in a computer communicatively coupled to a network (for example, the Internet), another computer, or in a standalone computer. As is known to those skilled in the art, a suitable computer can include a central processing unit ("CPU"), at least one read-only memory ("ROM"), at least one random access memory ("RAM"), at least one hard drive ("HD"), and one or more input/output ("I/O") device(s). The I/O devices can include a keyboard, monitor, printer, electronic pointing device (for example, mouse, trackball, stylus, touch pad, etc.), or the like.

ROM, RAM, and HD are computer memories for storing computer-executable instructions executable by the CPU or capable of being compiled or interpreted to be executable by the CPU. Suitable computer-executable instructions may reside on a computer readable medium (e.g., ROM, RAM, and/or HD), hardware circuitry or the like, or any combination thereof. Within this disclosure, the term "computer readable medium" is not limited to ROM, RAM, and HD and can include any type of data storage medium that can be read by a processor. For example, a computer-readable medium may refer to a data cartridge, a data backup magnetic tape, a floppy diskette, a flash memory drive, an optical data storage drive, a CD-ROM, ROM, RAM, HD, or the like. The processes described herein may be implemented in suitable computer-executable instructions that may reside on a computer readable medium (for example, a disk, CD-ROM, a memory, etc.). Alternatively, the computer-executable instructions may be stored as software code components on a direct access storage device array, magnetic tape, floppy diskette, optical storage device, or other appropriate computer-readable medium or storage device.

Any suitable programming language can be used to implement the routines, methods or programs of embodiments of the invention described herein, including C, C++, Java, JavaScript, HTML, or any other programming or scripting code, etc. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code an of the steps, operations, methods, routines or portions thereof described herein, where such software programming or code can be stored in a computer-readable medium and can be operated on by a processor to permit a computer to perform any of the steps, operations, methods, routines or portions thereof described herein. In general, the functions of the invention can be achieved by any means as is known in the art. For example, distributed, or networked systems, components and circuits can be used. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system or device. The computer readable medium can be, by way of example only but not by limitation, an electronic, magnetic, optical, electromagnetic, infrared, or semiconductor system, apparatus, system, device, propagation medium, or computer memory. Such computer-readable medium shall generally be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer readable media storing computer instructions translatable by one or more processors in a computing environment.

It will also be appreciated that one or more of the elements depicted in the drawings/figures can be implemented in a more separated or integrated manner, or even removed or rendered as inoperable in certain cases, as is useful in accordance with a particular application. Additionally, any signal arrows in the drawings/figures should be considered only as exemplary, and not limiting, unless otherwise specifically noted.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, including the claims that follow, a term preceded by "a" or "an" (and "the" when antecedent basis is "a" or "an") includes both singular and plural of such term, unless clearly indicated within the claim otherwise (i.e., that the reference "a" or "an" clearly indicates only the singular or only the plural). Also, as used in the description herein and throughout the claims that follow, the meaning of "in" includes "in" and "on" unless the context clearly dictates otherwise. The scope of the present disclosure should be determined by the following claims and their legal equivalents.

What is claimed is:

1. A method for remote caching, comprising:
    receiving, at a remote cache, a request for access to first content, wherein the first content is stored at a primary content management system, the remote cache includes a cache and metadata corresponding to content stored in the cache, and the content in the cache is managed by the primary content management system;
    determining that first metadata associated with the requested first content is stored at the remote cache;
    sending a first request including the first metadata to the primary content management system;
    receiving, at the remote cache, a first response from the primary content management system, the first response including second metadata associated with the first content;
    determining, at the remote cache, whether a copy of the first content stored in the cache is a current copy of the first content based on comparing, at the remote cache, the first metadata with the second metadata; and
    based on a result of the comparing, providing a response to the request for access to the first content.

2. The method of claim 1, wherein the remote cache is logically remote from the primary content management system.

3. The method of claim 1, wherein the remote cache is associated with a remote site, and the content in the cache is associated with the remote site.

4. The method of claim 1, further comprising:
    responsive to determining that the copy of the first content stored in the cache is not the current copy of the first content:
    sending a second request to the primary content management system for the current copy of the first content,
    obtaining the current copy of the first content based on a second response from the primary content management system, and
    storing the current copy of the first content in the cache of the remote cache server, wherein
    providing the response to the request for access to the first content includes allowing access to the current copy of the first content stored in the cache of the remote cache.

5. The method of claim 1, further comprising:
    responsive to determining that the copy of the first content stored in the cache at the remote cache is the current copy of the first content:
    providing the response to the request for access to the first content includes allowing access to the copy of the first content stored in the cache of the remote cache.

6. The method of claim 1, wherein the second response is a location of the current copy of the first content.

7. The method of claim 1, wherein the second response includes the current copy of the first content.

8. A system for remote caching, comprising:
    a remote cache system, including:
    a processor;
    a datastore including a remote cache for storing content, and storing metadata corresponding to content stored in the remote cache, wherein the content stored in the cache is managed by a primary content management system; and a non-transitory computer readable medium storing instructions that are executable by the processor for:

receiving a request for access to first content, wherein the first content is stored at the primary content management system;

determining that first metadata associated with the requested first content is stored at the remote cache;

sending a first request including the first metadata to the primary content management system;

receiving a first response from the primary content management system, the first response including second metadata associated with the first content;

determining whether a copy of the first content stored in the cache is a current copy of the first content based on comparing the first metadata with the second metadata; and based on a result of the comparing, providing a response to the request for access to the first content.

9. The system of claim 8, wherein the remote cache is logically remote from the primary content management system.

10. The system of claim 8, wherein the remote cache is associated with a remote site, and the content in the cache is associated with the remote site.

11. The system of claim 8, wherein the instructions are further executable by the processor for:

responsive to determining that the copy of the first content stored in the cache is not the current copy of the first content:

sending a second request to the primary content management system for the current copy of the first content, obtaining the current copy of the first content based on a second response from the primary content management system, and storing the current copy of the first content in the cache of the remote cache server, wherein providing the response to the request for access to the first content includes allowing access to the current copy of the first content stored in the cache of the remote cache.

12. The system of claim 8, wherein the instructions are further executable by the processor for:

responsive to determining that the copy of the first content stored in the cache at the remote cache is the current copy of the first content:

providing the response to the request for access to the first content includes allowing access to the copy of the first content stored in the cache of the remote cache.

13. The system of claim 8, wherein the second response is a location of the current copy of the first content.

14. The system of claim 8, wherein the second response includes the current copy of the first content.

15. A non-transitory computer readable medium storing instructions for:

receiving, at a remote cache, a request for access to first content, wherein the first content is stored at a primary content management system, the remote cache includes a cache and metadata corresponding to content stored in the cache, and the content in the cache is managed by the primary content management system;

determining that first metadata associated with the requested first content is stored at the remote cache;

sending a first request including the first metadata to the primary content management system;

receiving, at the remote cache, a first response from the primary content management system, the first response including second metadata associated with the first content;

determining, at the remote cache, whether a copy of the first content stored in the cache is a current copy of the first content based on comparing, at the remote cache, the first metadata with the second metadata; and based on a result of the comparing, providing a response to the request for access to the first content.

16. The non-transitory computer readable medium of claim 15, wherein the remote cache is logically remote from the primary content management system.

17. The non-transitory computer readable medium of claim 15, wherein the remote cache is associated with a remote site, and the content in the cache is associated with the remote site.

18. The non-transitory computer readable medium of claim 15, wherein the instructions are further for:

responsive to determining that the copy of the first content stored in the cache is not the current copy of the first content:

sending a second request to the primary content management system for the current copy of the first content, obtaining the current copy of the first content based on a second response from the primary content management system, and storing the current copy of the first content in the cache of the remote cache server, wherein providing the response to the request for access to the first content includes allowing access to the current copy of the first content stored in the cache of the remote cache.

19. The non-transitory computer readable medium of claim 15, wherein the instructions are further for:

responsive to determining that the copy of the first content stored in the cache at the remote cache is the current copy of the first content:

providing the response to the request for access to the first content includes allowing access to the copy of the first content stored in the cache of the remote cache.

20. The non-transitory computer readable medium of claim 15, wherein the second response is a location of the current copy of the first content.

21. The non-transitory computer readable medium of claim 15, wherein the second response includes the current copy of the first content.

* * * * *